United States Patent [19]

Kellermann et al.

[11] 4,133,625

[45] Jan. 9, 1979

[54] MACHINE FOR FORGING AND THERMOFORMING HOLLOW THERMOPLASTIC BIAXIALLY ORIENTED ARTICLES

[75] Inventors: Arnold L. Kellermann, Goshen; David I. McDonald, Cincinnati, both of Ohio

[73] Assignee: Cincinnati Milacron Inc., Cincinnati, Ohio

[21] Appl. No.: 821,176

[22] Filed: Aug. 2, 1977

[51] Int. Cl.² .................... B29C 3/00; B29C 17/04
[52] U.S. Cl. .................... 425/394; 425/388; 425/47; 425/383; 425/326.1; 425/444; 425/556; 425/595; 425/451.9
[58] Field of Search .................... 425/388, 394, 3, 34, 425/40, 383, 326.1, 135, 556, 444

[56] References Cited

U.S. PATENT DOCUMENTS

| | | | |
|---|---|---|---|
| 2,198,493 | 4/1940 | Freeman | 425/40 |
| 2,290,630 | 7/1942 | Bosomworth et al. | 425/34 |
| 2,828,507 | 4/1958 | Strauss | 425/556 X |
| 2,862,232 | 12/1958 | Rekettye | 425/3 |
| 2,923,976 | 2/1960 | Strauss | 425/444 X |
| 3,183,291 | 5/1965 | Miller et al. | 425/394 X |
| 3,192,800 | 7/1965 | Kostur | 425/394 X |
| 3,526,690 | 9/1970 | Bachman | 425/135 |
| 3,810,731 | 5/1974 | Anderson | 425/388 |
| 3,868,209 | 2/1975 | Howell | 425/388 X |
| 3,947,204 | 3/1976 | Ayres et al. | 425/383 |
| 3,964,237 | 6/1976 | Johannsen | 425/388 X |
| 4,005,967 | 2/1977 | Ayres et al. | 425/326.1 |

Primary Examiner—J. Howard Flint, Jr.
Attorney, Agent, or Firm—Daniel P. Worth

[57] ABSTRACT

A machine for automatically forging and thermoforming of hollow thermoplastic biaxially oriented articles has a carrier assembly to carry, lock and unlock forging dies, indexing means to move the carrier assembly and dies past a series of work stations, and an article unloading means. Three work stations are in the automatic machine: forging where the die parts are locked together and the workpiece is forged into engagement with the die; thermoforming to which the die with the workpiece (now called a preform) gripped therein is moved into register with thermoforming mold means; and article ejecting means which include mechanical means for unlocking the die and removing the hollow article therefrom. The carrier assembly is so supported that the strains of forging and thermoforming are taken up by frame tie rods rather than the die mounting means.

17 Claims, 34 Drawing Figures

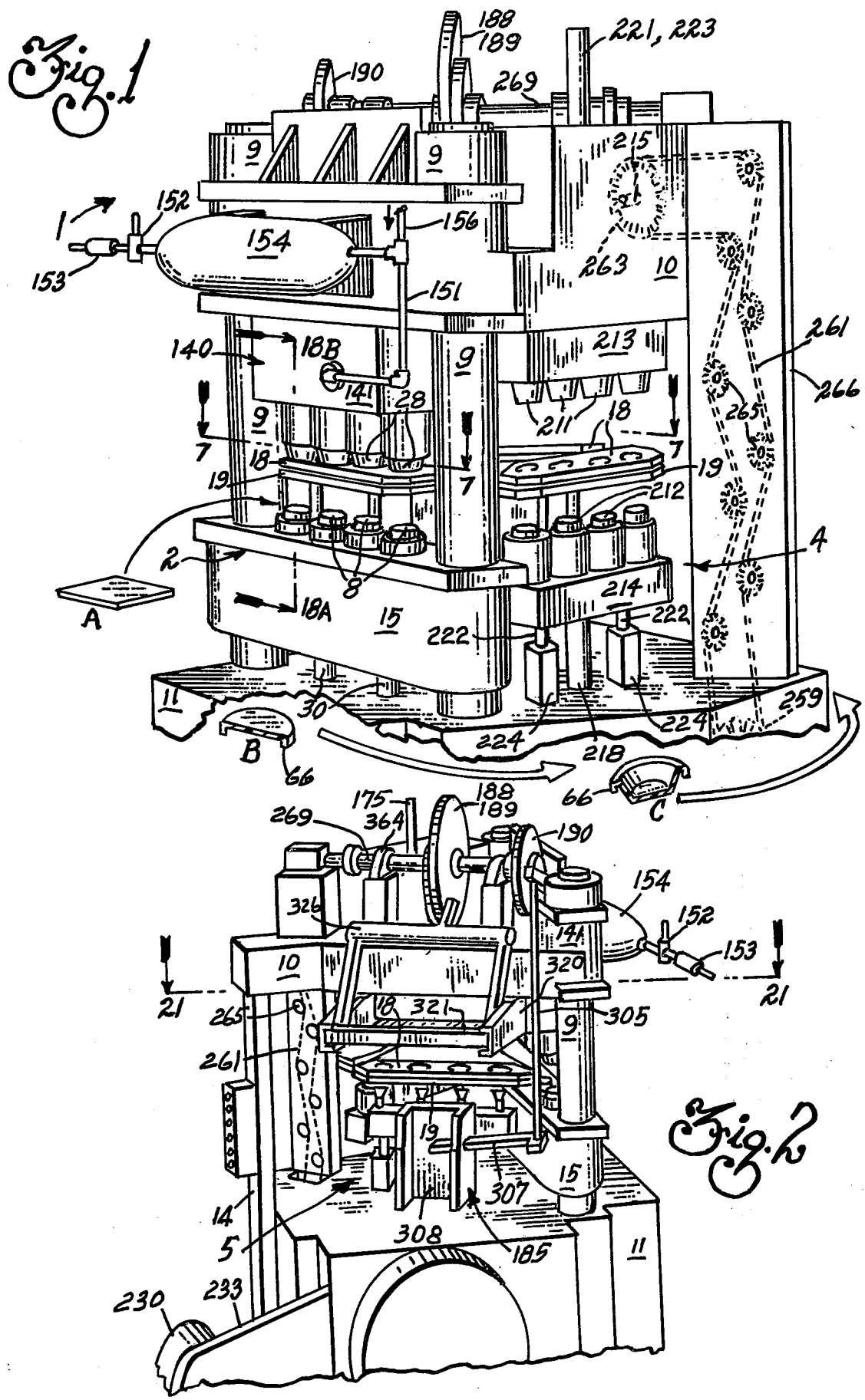

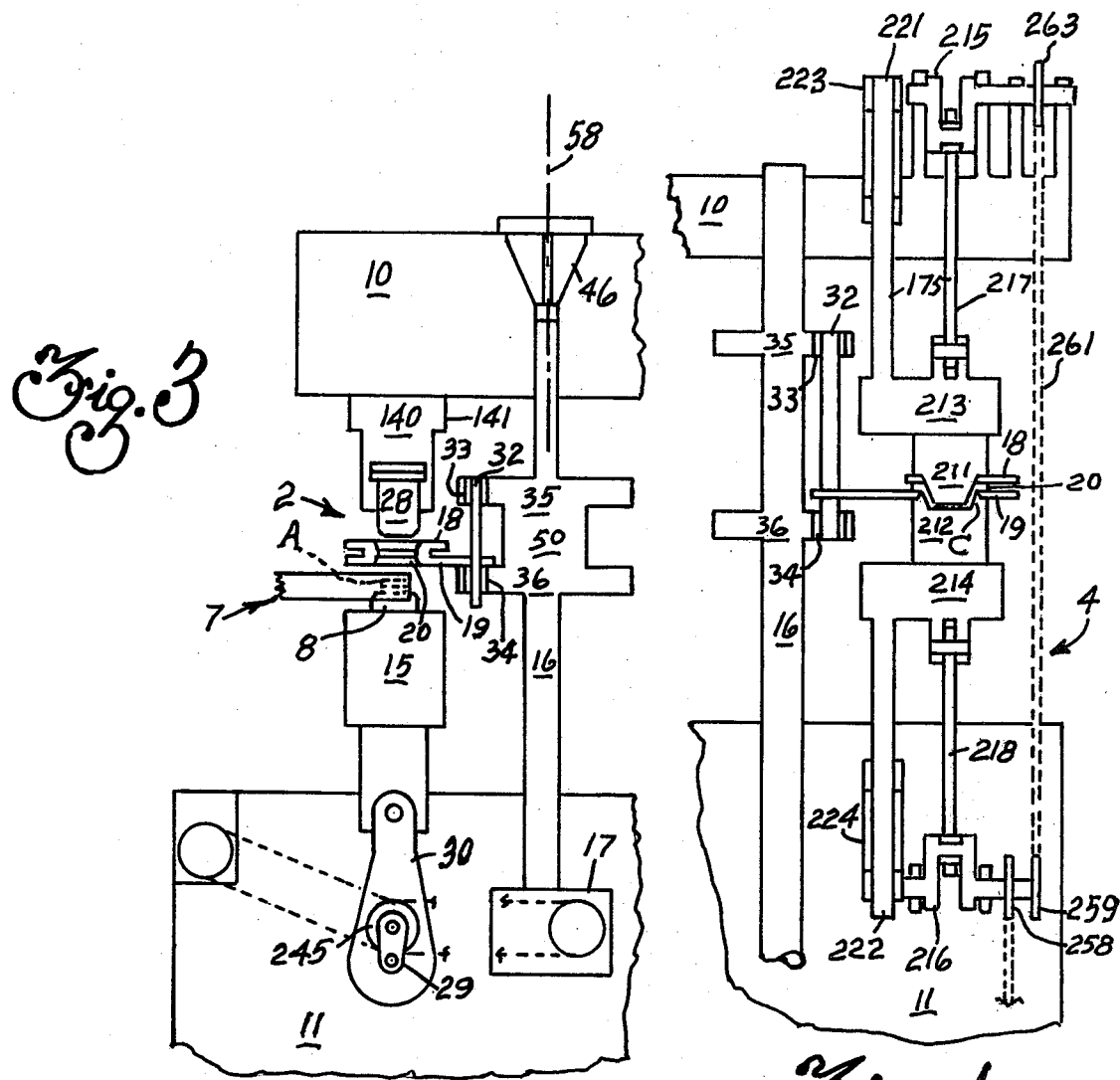
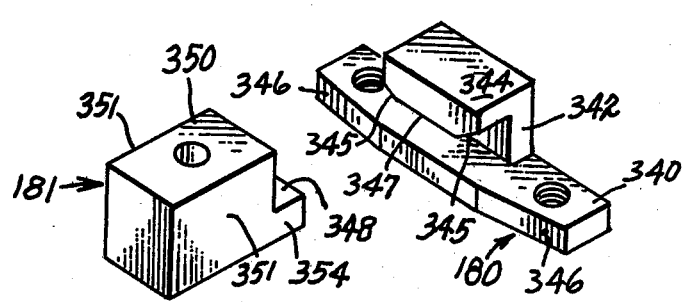

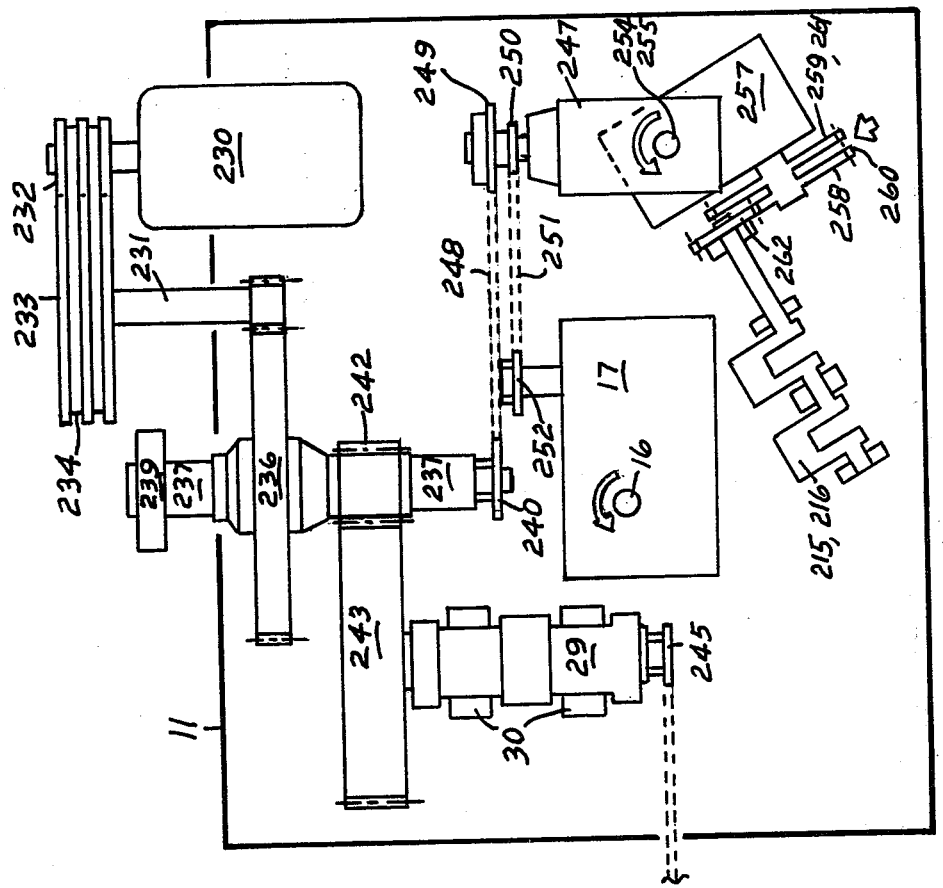
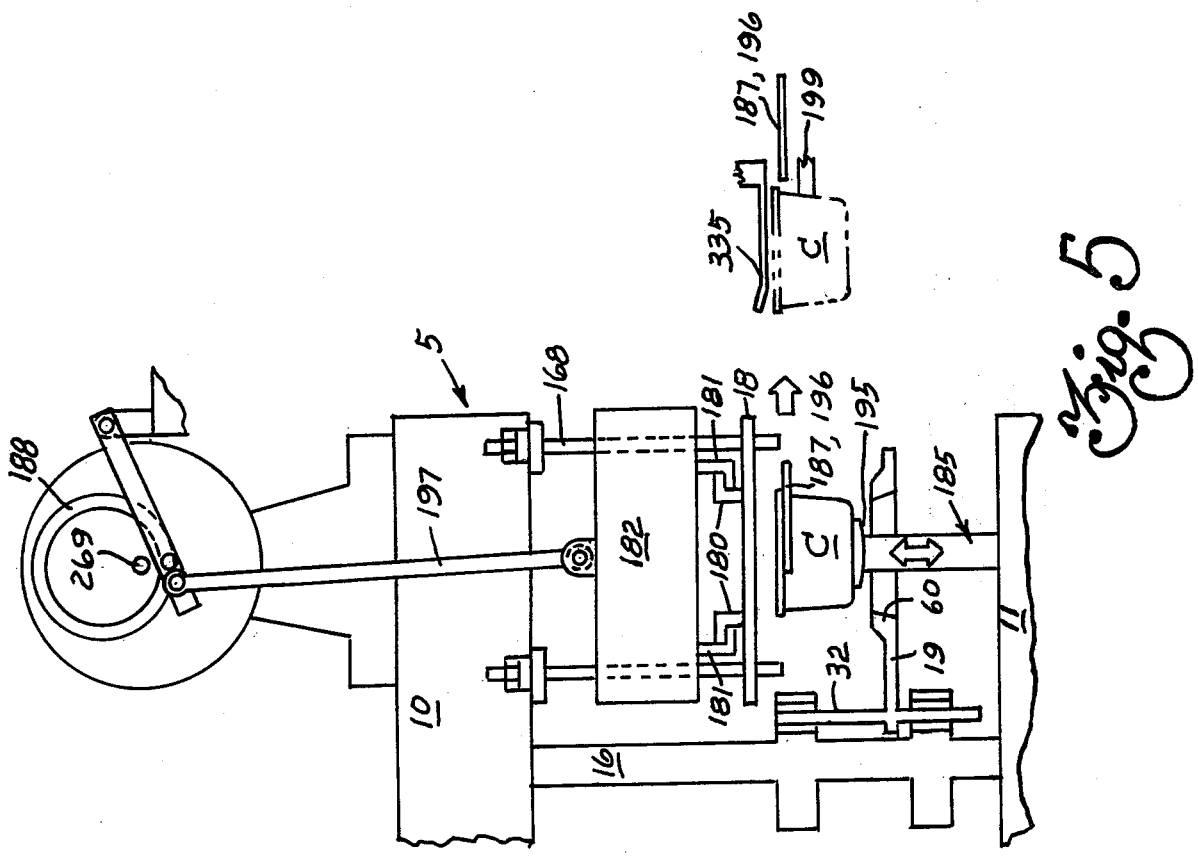

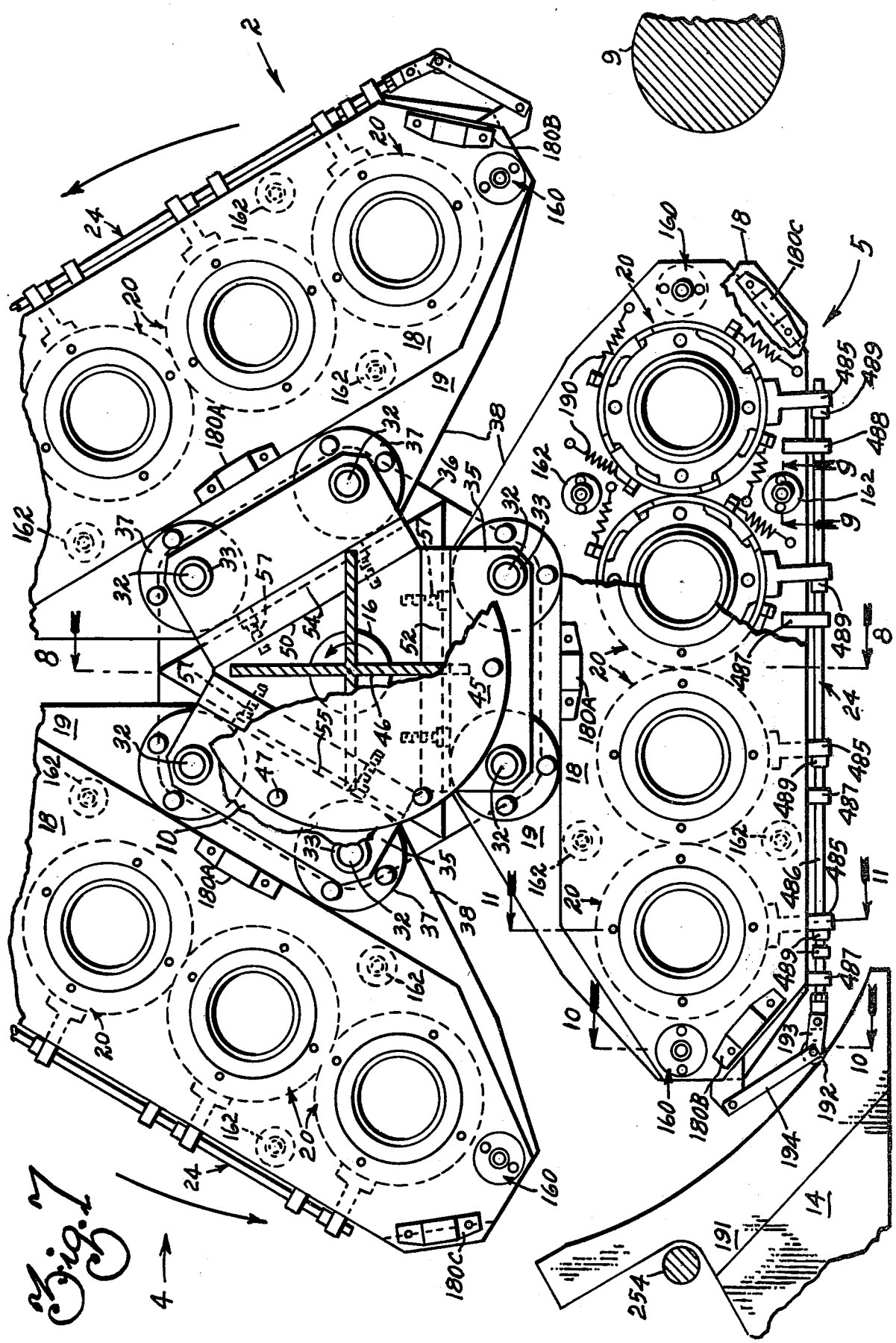

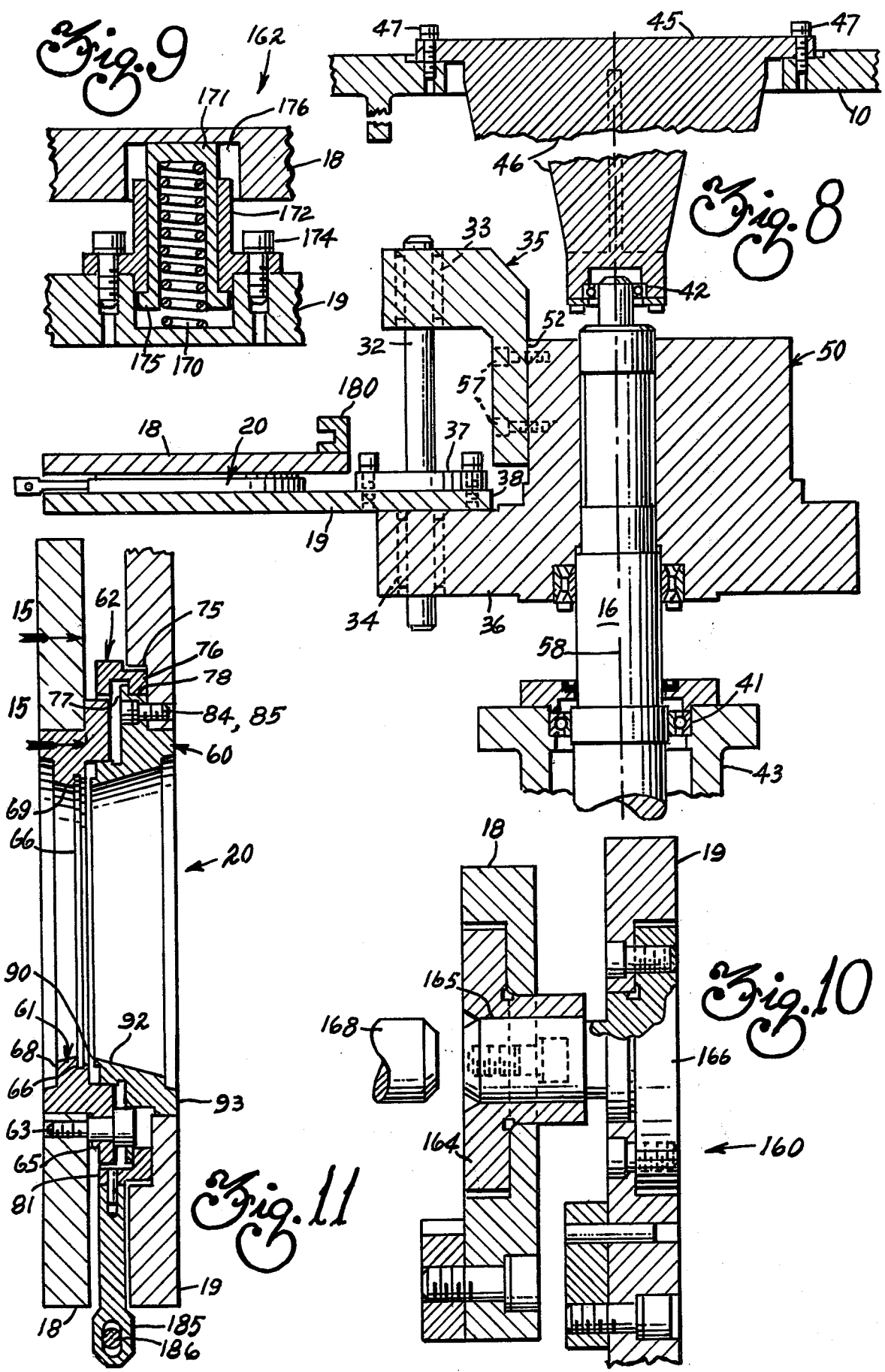

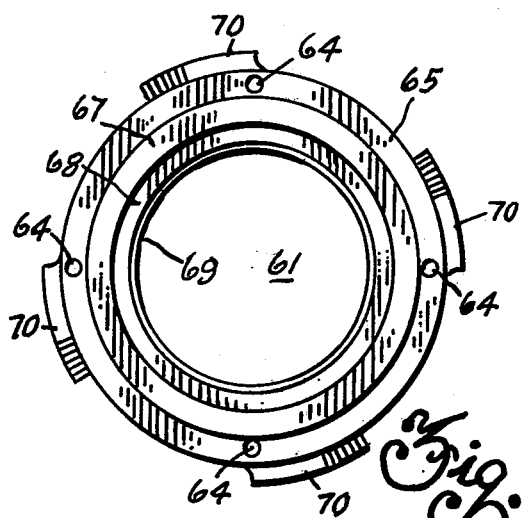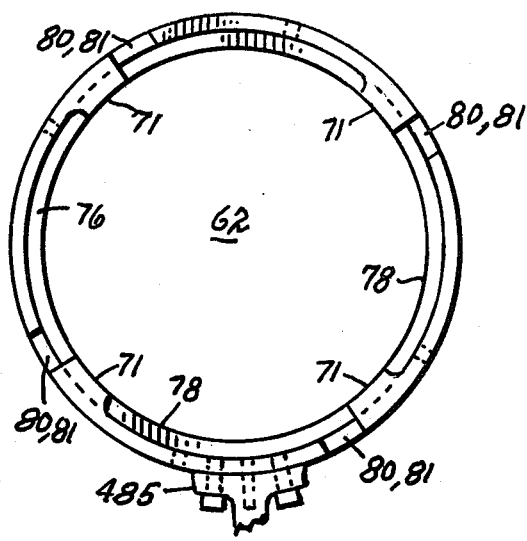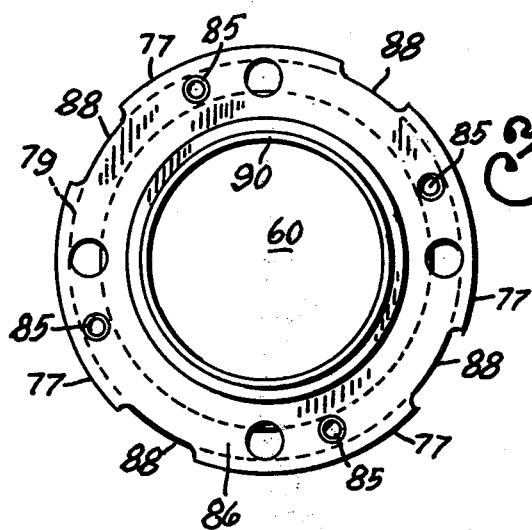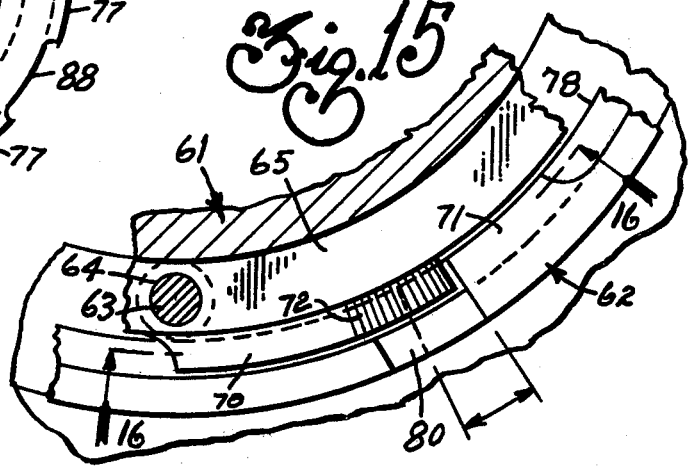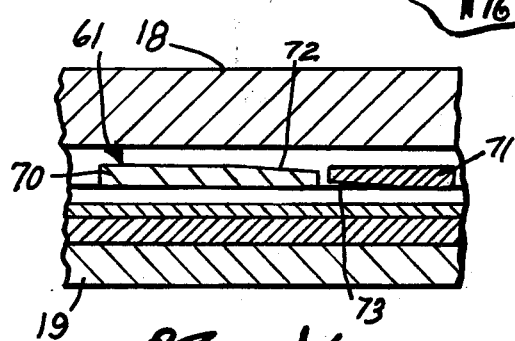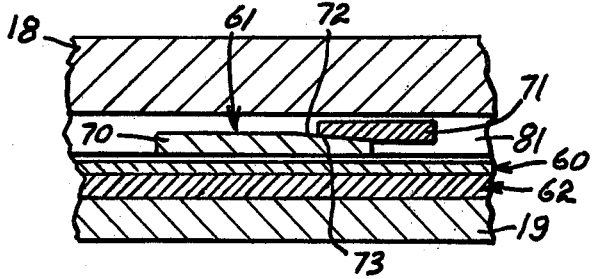

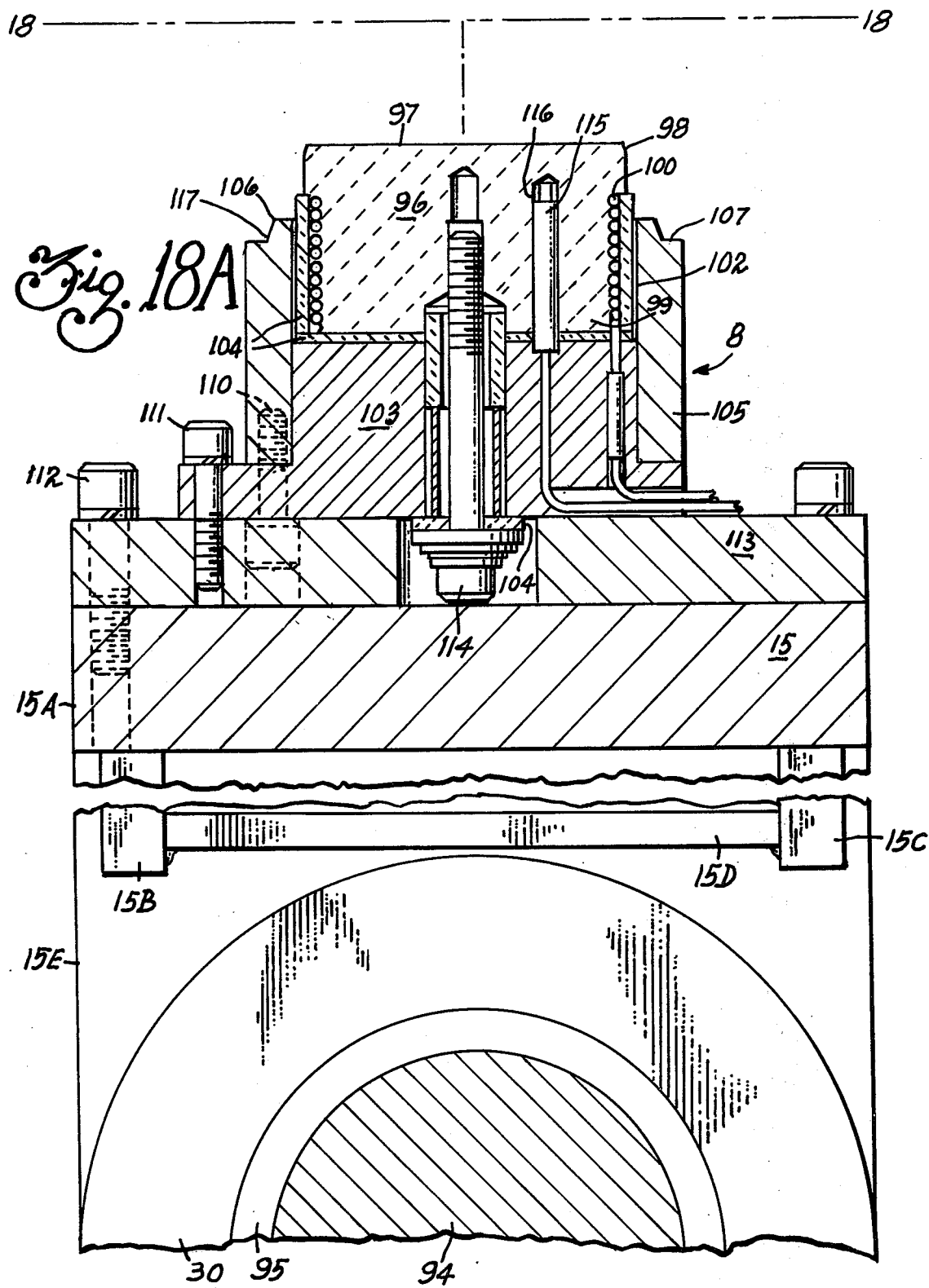

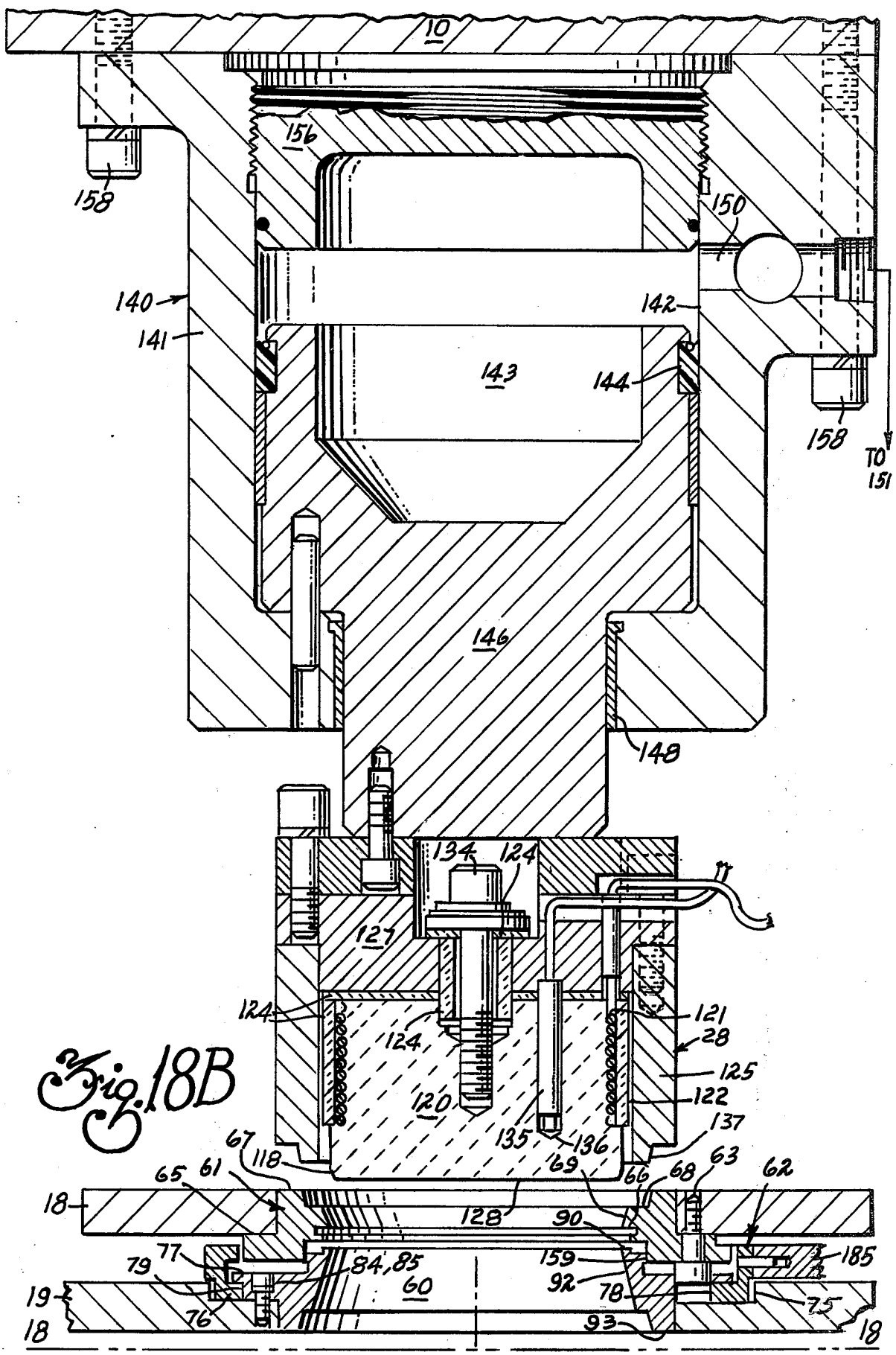

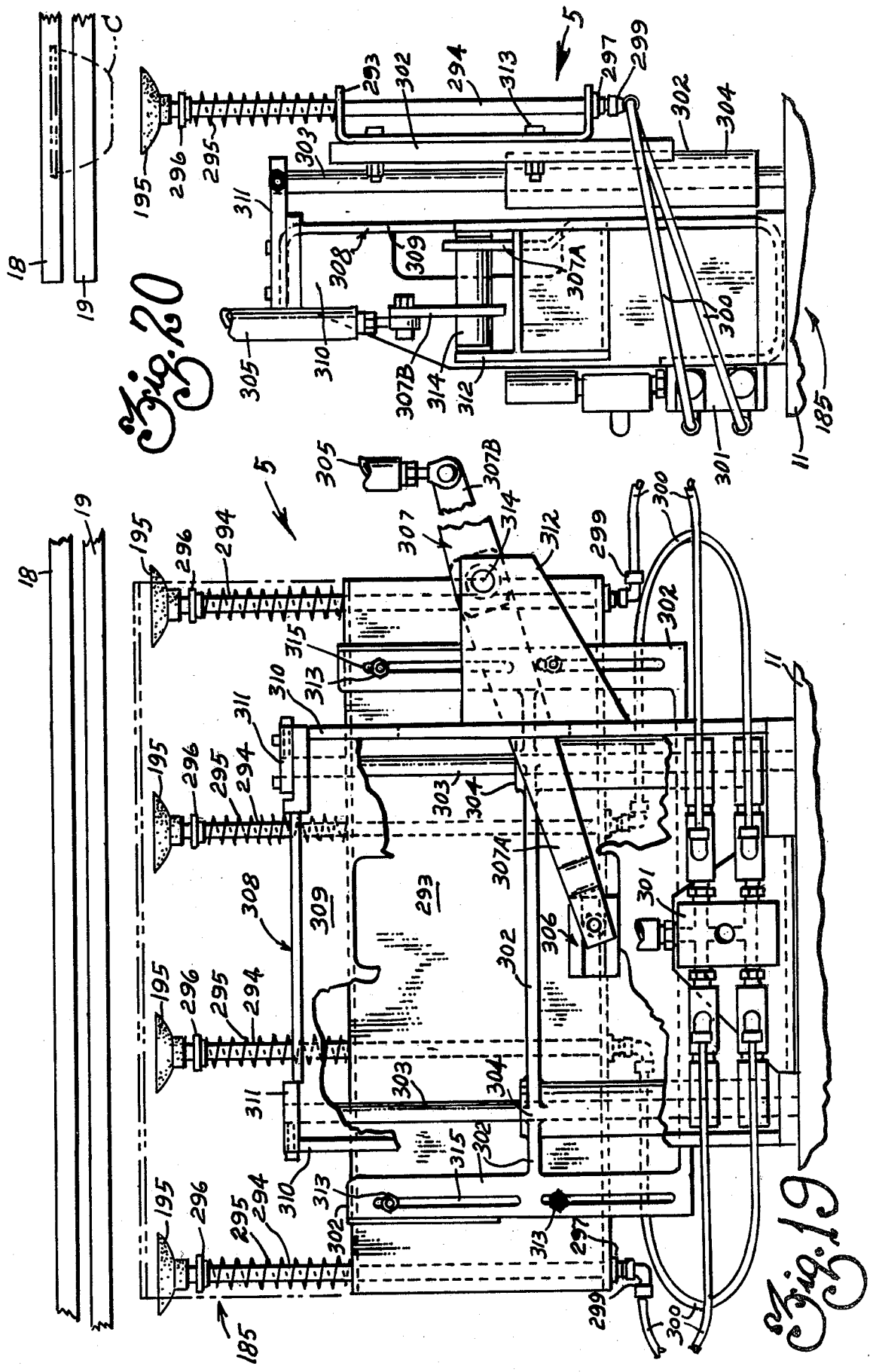

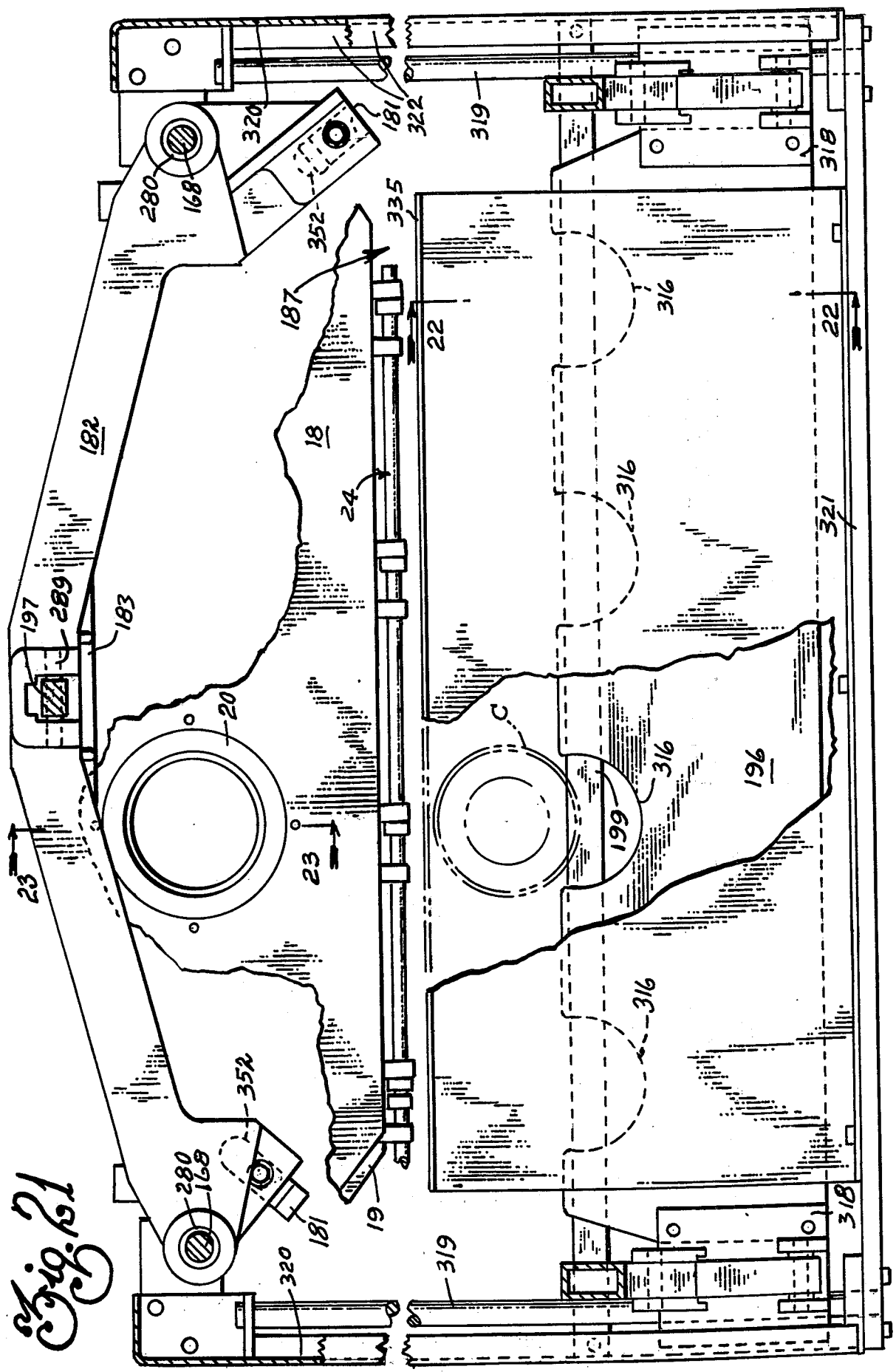

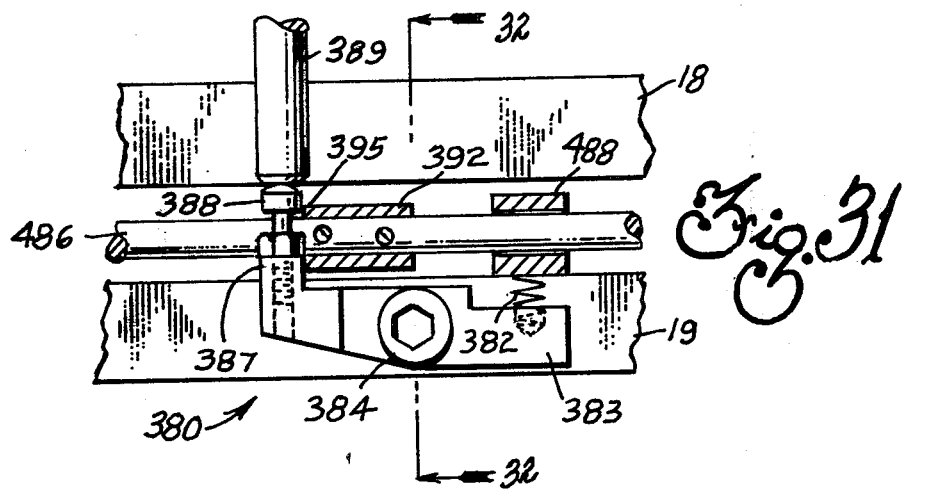
Fig. 31
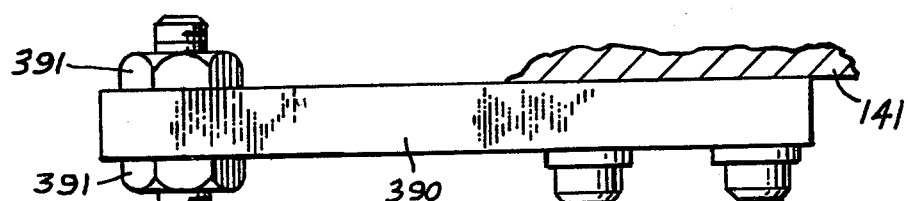
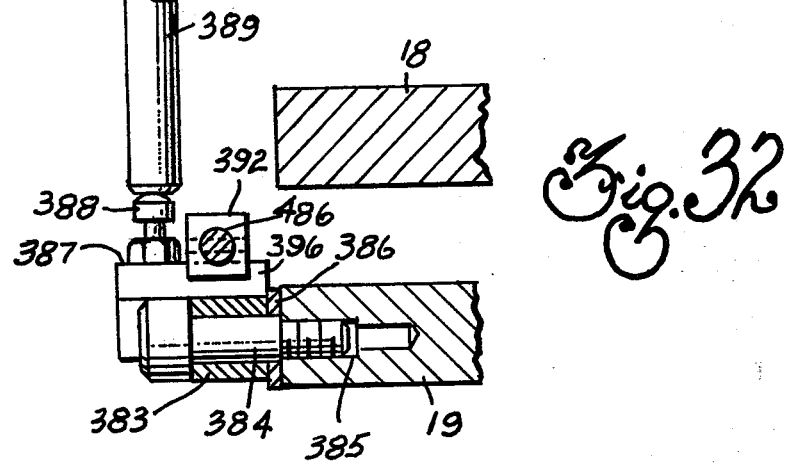
Fig. 32
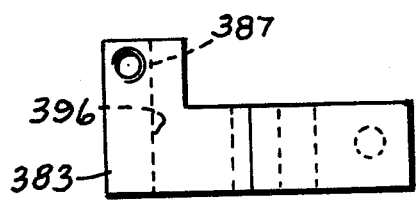
Fig. 33

MACHINE FOR FORGING AND THERMOFORMING HOLLOW THERMOPLASTIC BIAXIALLY ORIENTED ARTICLES

BACKGROUND AND SUMMARY OF INVENTION

This invention relates to forging and thermoforming to make hollow articles of thermoplastic biaxially oriented resin. An aspect concerns automatic forging and thermoforming of same. An aspect of the invention is an improved carrier for the die in which the workpiece is held during the various shaping processes. An aspect of the invention is an improved unloading means which include mold unlocking means and ejection or article removing apparatus.

The present invention is an improvement on the teachings of U.S. Pat. Nos. 3,739,052, 3,947,204, and 4,005,967 which collectively deal with the forging and thermoforming of articles from a lubricated blank that has been heated to a temperature for biaxial orientation and with tooling for carrying out the forging and thermoforming steps.

The forging operation smashes the blank between hammer and anvil thereby forcing it out into engagement with the die set (die) thereby making what is called a preform characterized by a disc or flat center surrounded by a lip. The preform lip is locked into the die and remains so until the finished article is ejected. The preform is transported while locked into the die to a thermoformng station where it is formed into a hollow article. The temperature of the blank, preform, and article is maintained at a level to permit biaxial orientation. The lip provides a strong mechanical engagement between the preform and the die itself. After being thermoformed, the article is removed still locked in the die to the ejection station where the die is unlocked and article removed.

The present invention improves on the die of U.S. Pat. Nos. 3,947,204 and 4,005,967 by providing means for mechanically rapidly locking and unlocking the die set preparatory to, respectively, forging and later on ejection. The invention also relates to die carrier or support means and to ejection means. One or more sets of dies can be provided. Ordinarily, the requirement of modern day mass production would insist on a plurality of die sets and their respective workpieces being presented at each of the three contemplated stations of this apparatus. The simultaneous use of four sets of dies is described herein for purposes of illustration and example. In the interest of brevity, the mechanism for only one die set will be established, it being understood that the other die sets are similarly, and ordinarily identically, constructed.

The present invention also includes a carrier assembly for mounting the aforesaid die sets and keeping them in alignment while moving same through the various operations and workstations. This carrier assembly preferably includes a set of matched carrier plates containing parts of the die set and also including a locking ring which is rotated responsive to machine position in order to lock the dies. The carrier plates are uniquely supported by carrier support means so as to float with and achieve a die-closing operation conjointly with the locking operation. The carrier plate mounting is such as to confine forging stress to a set of tie rods.

Thus the invention includes a machine for transporting a workpiece to a series of workstations comprising — a machine frame; a shaft revolvably supported in said frame and having an axis about which it revolves; a carrier assembly for engaging at least one workpiece; a carrier support means mounted betwen and to one of said shaft and said carrier assembly for supporting one of them for motion relative to the other parallel to said axis and for supporting said carrier assembly at a position that aligns said carrier assembly with said workstation upon arrival at the latter.

Another interesting aspect of the invention is the stripping or ejection means which is so designed as to provide sufficient daylight or opening between the lip ring dies so that the finished article can be removed therefrom. As described in further detail below, this opening feature is characterized by an upper carrier plate that has a set of opening lugs which are engaged at the ejection station to pull the upper carrier plate and die completely free of the lower plate and whatever dies it carries. Even though the two plates are thus widely separated the device is so designed as to put the carrier plates and dies carried thereby back together in the correct and very exacting alignment.

Thus the invention includes a machine for removing a lipped article from a carrier assembly that has clamping means that engage at least a portion of the article lip and has transported the workpiece from whence derived the article through shaping procedures comprising — unclamping means for separating the carrier assembly to disengage said clamping relation and to space apart carrier assembly components by an amount sufficient to permit removal of said article through the space between said spaced apart components; removing means for removing the article from engagement by any component of said carrier assembly and temporarily retaining it within such space; and means for withdrawing said article through said space by which said components are separated.

Other objects advantages and features will be observed from a reading of the following description and claims in conjunction with the following drawings wherein:

FIG. 1 is a perspective view of the assembled mechanism showing the forging and thermoforming work stations and workpiece shapes A, B, C with B, C being isometric sections;

FIG. 2 is another perspective view of the assembly of FIG. 1 from the ejection workstation side;

Figure 22:
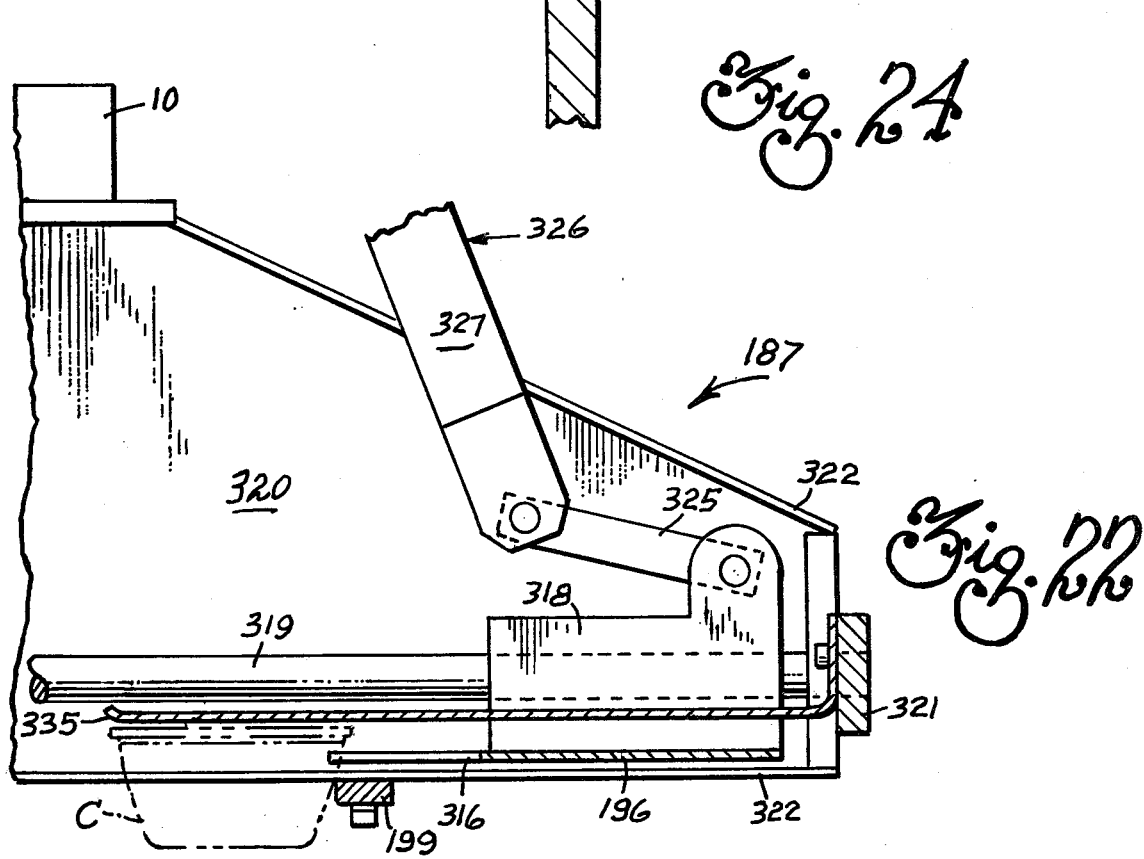

FIGS. 3, 4, and 5, respectively, are schematic vertical section veiws showing the main features of the forging, thermoforming, and ejecting workstations, and are presented to facilitate understanding the other Figs. herein;

FIG. 6 is a schematic plan view of the base showing the drive train;

FIG. 7 is a horizontal section view from plane 7—7 in FIG. 1 to show the carrier and index assembly top (plan) view with part of the top carrier plate and upper lip rings removed on one of the carrier plate pairs;

FIG. 8 is a vertical section along 8—8 of FIG. 7 and similar to schematic FIG. 3 showing the preferred structure of the carrier plates and their mounting means;

FIGS. 9 and 10 are vertical sections on 9—9 and 10—10 of FIG. 7 illustrating carrier plate spacing means and carrier plate alignment means, respectively;

FIG. 11 is a vertical section view along 11—11 of FIG. 7 showing the lip ring dies unlocked and partially engaged or partly disengaged;

FIGS. 12, 13, and 14 are plan views of the top, bottom and locking ring dies of the FIG. 11 assemblage;

FIG. 15 is a partial top view along 15—15 of FIG. 11 and showing in solid lines die rings unlocked, and in dotted lines their locked position;

FIGS. 16 and 17, respectively, are partial side views along 16—16 of FIG. 15 showing the locking ring lugs disengaged or ejector workstation position and showing the lugs engaged as at the forging and forming stations and in dotted lines in FIG. 15;

FIG. 18A and 18B are vertical sections along 18A-18B of FIG. 1 showing the hammer (18A) and anvil (18B) structure and their relation to the carrier plates and die rings, crown, and crosshead and divided for illustration along horizontal plane 18—18;

FIGS. 19 and 20 are front and side views of the vacuum cup portion of the ejector that is shown in FIGS. 2 and 5, a portion of the ejector support assembly weldment being partially cut away in FIG. 19 for clarity;

FIG. 21 is a plan view of the ejector workstation as seen from plane 21—21 in FIG. 2, only one die set being shown with a cup in ghost lines aligned therewith;

FIG. 22 is a vertical section of the side view stripper plate along 22—22 of FIG. 21.

Figure 24:
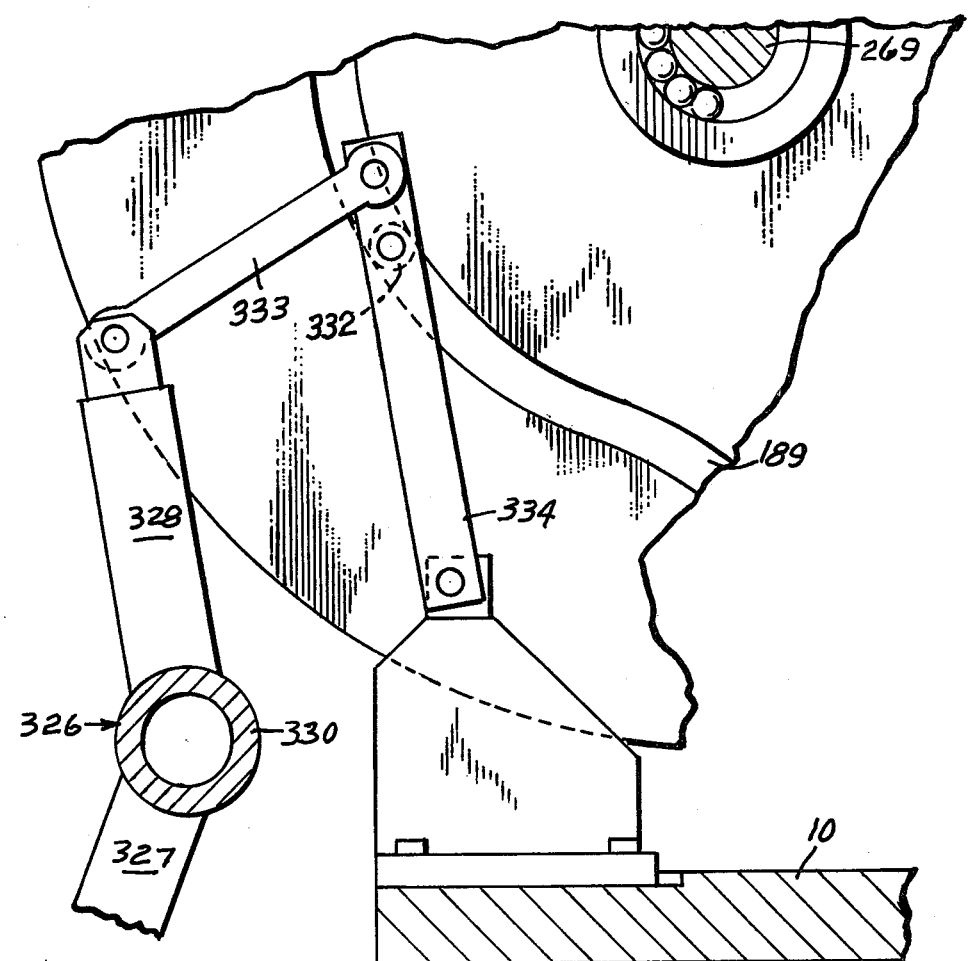
Figure 23:
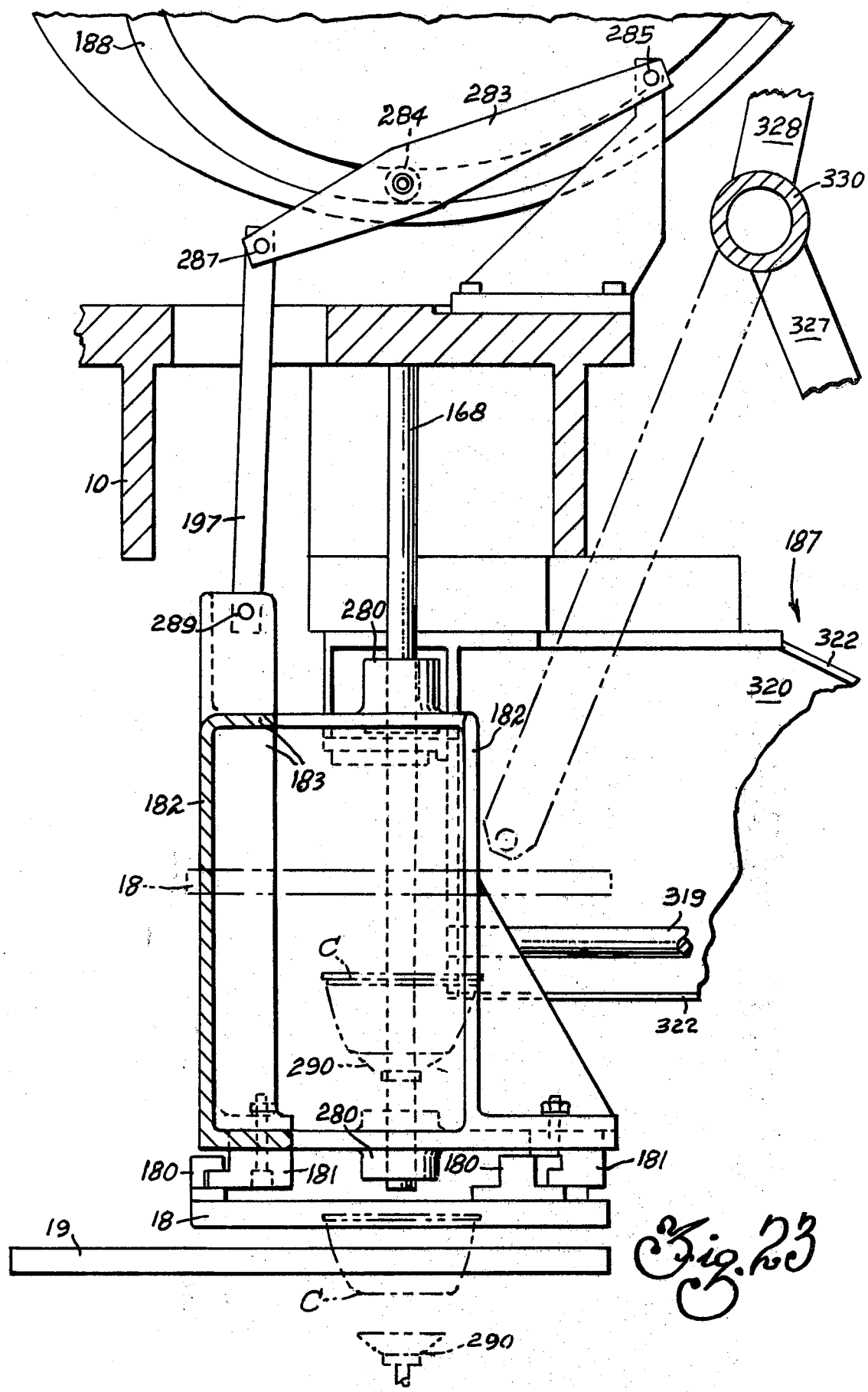
Figure 25:
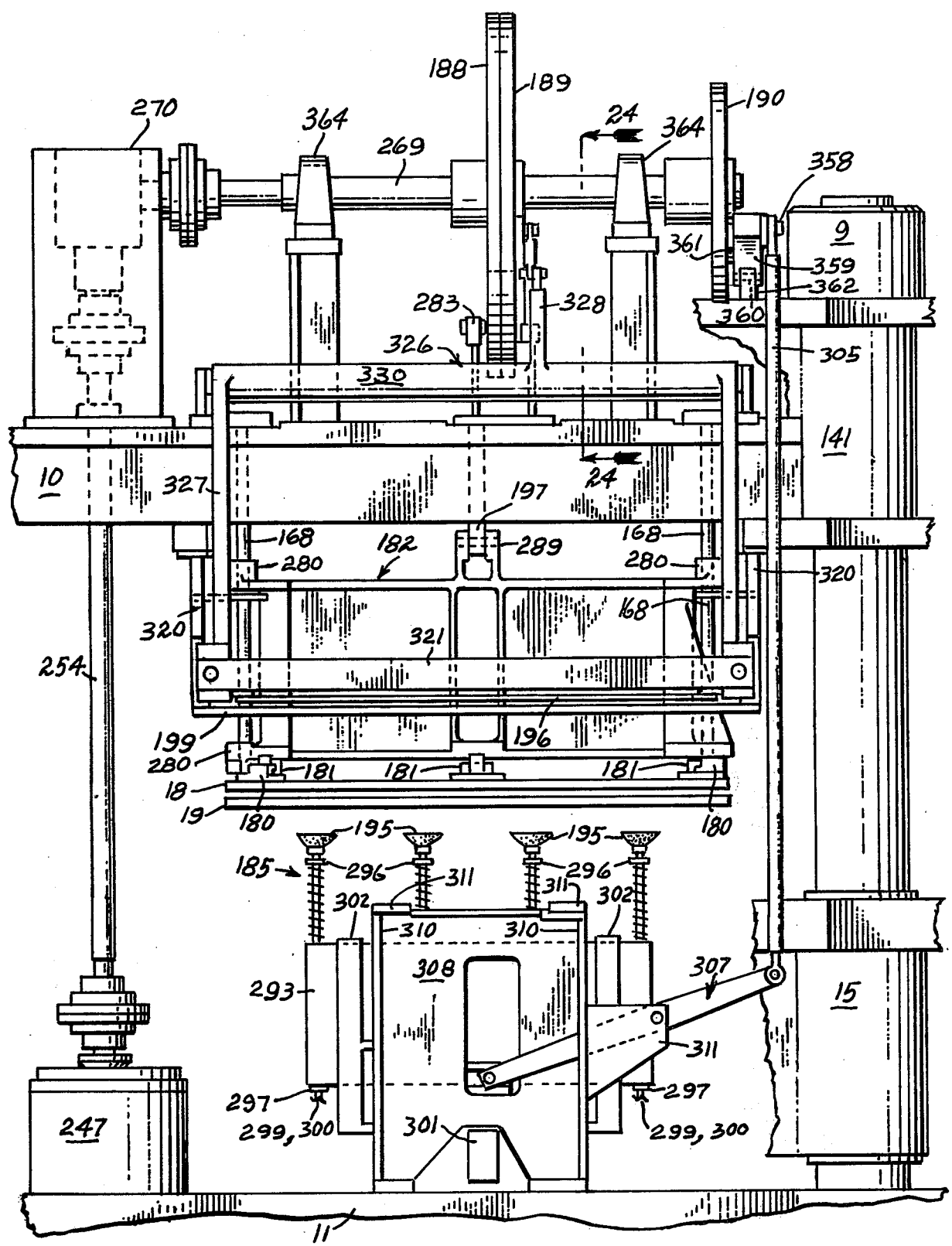
Figure 26:
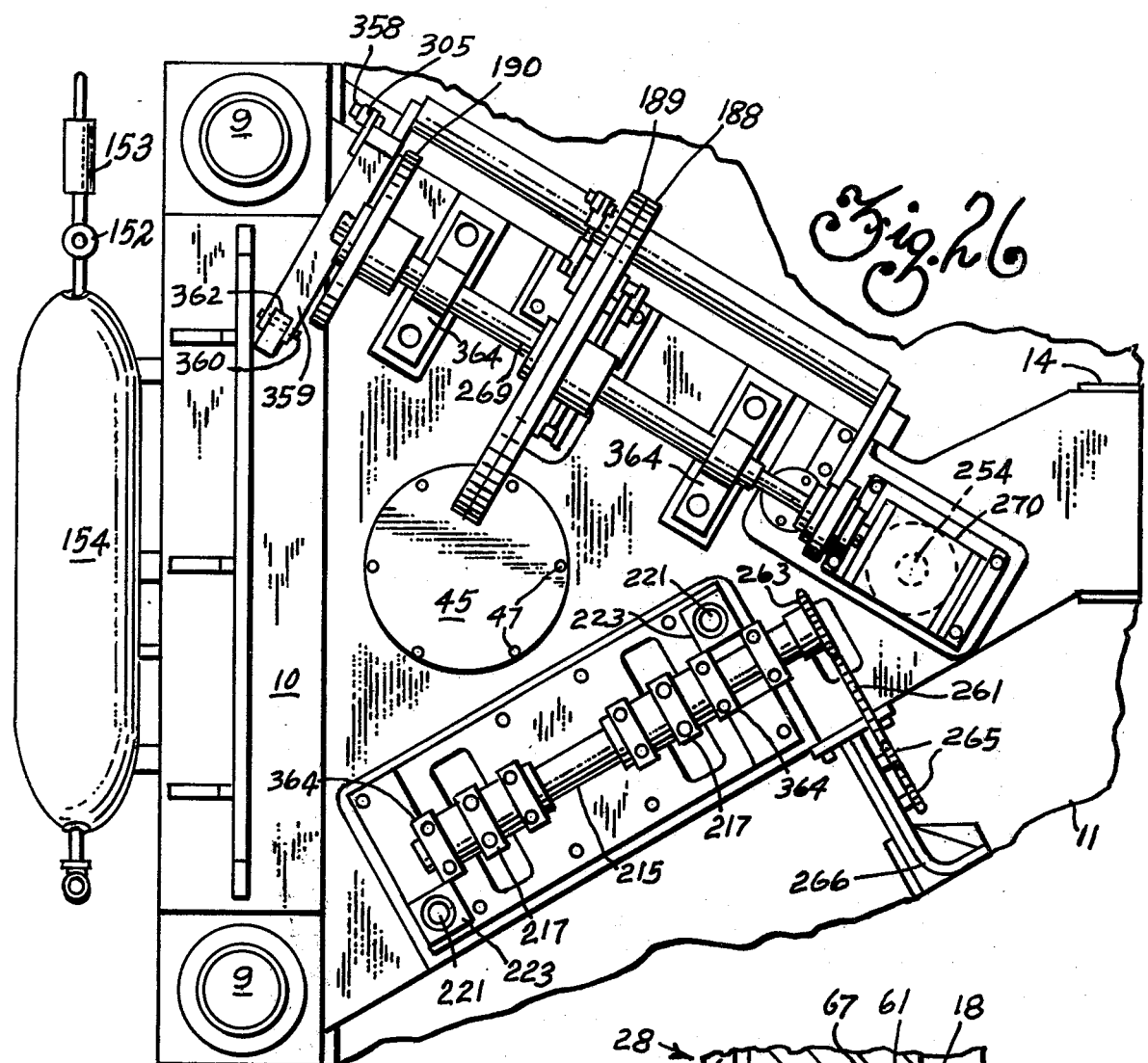
Figure 28:
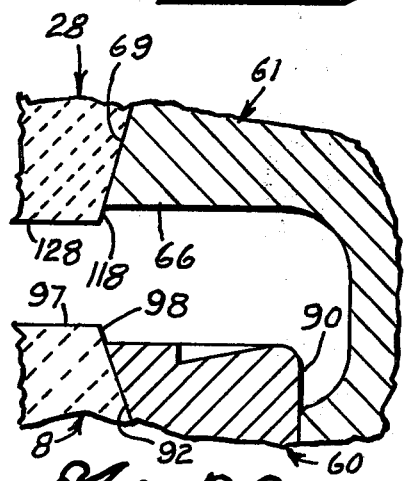
Figure 27:
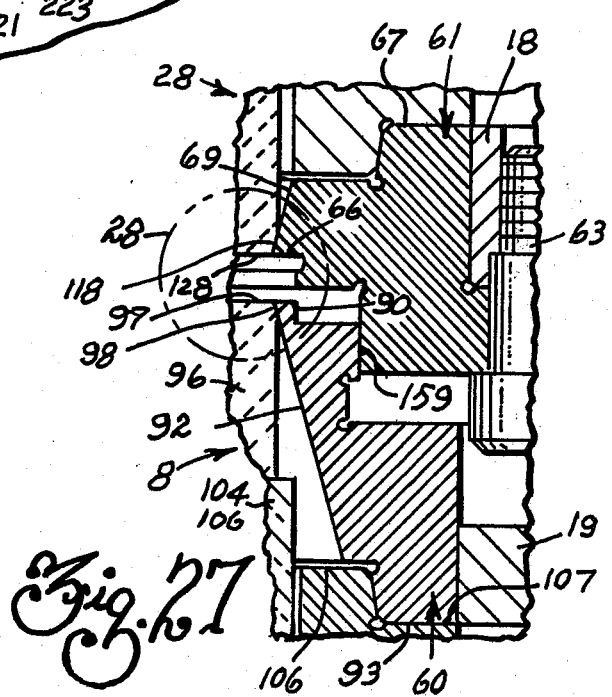

FIG. 23 is a vertical section of the side view carrier plate lifting crosshead along 23—23 of FIG. 21 further including part of the face cam drive;

FIG. 24 shows the drive means for the stripper plate at the ejector workstation;

FIG. 25 is an enlarged elevation view of the ejection workstation;

FIG. 26 is a plan view of the crown;

FIG. 27 is an enlarged view of the die set rings and anvils of FIGS. 11, 18;

FIG. 28 is an enlarged view of the tooling of FIG. 27 in the closed position showing also the shape of the workpiece lip;

FIGS. 29 and 30 are isometric views of the lifting lugs and lifting blocks, respectively;

FIGS. 31 and 32 are views of the lip ring locking delay and trip means, a preferred feature, as seen respectively at 488 of FIG. 7 and section 32—32 of FIG. 31, the parts being shown in their positions where the lip rings are not locked together; and FIG. 33 is a bottom view of the trip lever of FIGS. 31, 32.

This describes the invention by way of example but not limitation as a machine for manufacturing four tubs (or wide mouth containers) at a time.

Overview of What the Machine Does to the Workpiece (FIGS. 1-5)

A detailed description of the procedure, materials and means are found in the several U.S. patents identified earlier herein which are incorporated herein by reference in their entirety. A brief summary of what is done to the workpiece is presented here for the convenience of the reader and to improve the understanding of what the present machine does.

Viewed in a large sense the present machine converts a blank of plastic material to a hollow container by a series of operations that include forging followed by thermoforming. The shapes of the workpiece at various stations are shown at A, B, C in FIG. 1.

More particularly a blank A shaped as in FIG. 1 is provided to the machine. As noted in the aforesaid patents, this blank is preferably rectangular — most preferably square — in shape and has its external surfaces lubricated. The blank A has a predetermined volume of material in it, a measurement which is important because of the workpiece volume required by the forging die cavity (FIGS. 7, 11-17). The blank A is provided from an oven at a biaxial orientation temperature to the foreging workstation (and apparatus 2) of the present machine. Actually, it is placed directly onto the hammer of the forging station 2 by either manual means or automatic transfer means as illustrated, e.g., in FIG. 3.

The blank A is forged at the foreging workstation into a preform B characterized by a circular disc surrounded by a lip. The lip is an enlarged peripheral region surrounding the disc and may comprise a peripheral flange, thickened rings and so forth as described in the several patents. One function of the lip herein is to facilitate gripping of the preform by the die set at 2 because the preform B and ultimately the hollow article formed therefrom will be gripped by this die throughout thermoforming and until the workpiece ejection from the machine.

The preform B is moved in the direction of the arrow while at a biaxial orienting temperature quickly to the thermoforming workstation 4 (FIGS. 1, 4, 7) where a conventional thermoforming procedure is carried out to form it into the final product illustrated here as a hollow tub C having a lip ring around the edge.

The tub or other product C then is moved to the next workstation of this machine which is the ejection unit 5 (FIGS. 2, 5, 19, 20) which strips the tub C out of the die assembly which has carried the workpiece through all of its stages at 2, 4, 5.

The present invention follows the foregoing procedures in the treatment accorded each blank A as it progresses through the machine. The automatic machine of the present invention is designed to process simultaneously a plurality of workpieces at each of three workstations: four blanks A are forged into preforms B at forging station 2 while the preceding group of four are being thermoformed from preforms into tubs C at forming station 4 and while another and earlier group of workpieces — now tub C — are being ejected from the machine. After the foregoing events, each group of workpieces in the machine is advanced to the next station, the empty machine parts progress from the ejection to forging station where a new group of blanks A are received, and then the aforesaid simultaneous forge-thermoform-ejection operations are repeated.

Overall Description of Forging Station (FIGS. 1, 3, 7, 8)

Blanks A are heated to a very exact forging temperature and then placed by means 7 on the lower platen or anvil 8 (hammer) at the forging workstation 2 of the machine. The means 7 and manner of heating and transporting the blank or blanks or the machine 1 are no part of this invention and therefore are not described further.

This invention presents a machine having three workstations 2, 4, 5 and a triangular plan view (FIG. 7). The frame of the machine is generally triangular in character and has a pair of vertical tie rods (and nuts) 9 supporting the crown 10 of the machine above the base 11. The tie rods and rear column 14 (FIG. 26) are located one on each side of the forging station 2 to take up the forging loads and to provide ways (guides) for the moving anvil or hammer crosshead 15 on which are mounted four anvils 8.

In the center of the machine (FIGS. 3, 7, 8) is a vertical indexing drive shaft 16 aligned on a vertical axis 58 or carrier shaft 16 which is driven by an indexing angle drive 17, the latter being a standard commercial unit located in the base of the machine. From this drive shaft 16 (FIG. 7) are suspended in cantilever fashion three pairs of horizontal carrier plates 18, 19 each of which pairs carries at least one die set 20 (four are illustrated) as well as locking means 24 for unlocking and delaying locking (see last subtitle below re: FIGS. 31, 32, 32 for delay feature) the die set 20 supported by each pair of carrier plates. The carrier plates index 120° periodically in a horizontal plane.

The frame of the machine supports at the forging station a pair of platens or anvils 8, 28 for each die set. The upper of these anvils 28 is fixed and does not move but is supported from the crown. The other is the moving anvil 8 (hammer) which is supported on the crosshead 15 that is the slide of a slider crank mechanism and is vertically reciprocating by a crank shaft 29 (FIG. 3, 6) and connecting rod 30 driven in timed relationship with other operations of the machine. As best seen in FIGS. 3, 7, 18A and 18B the die set components are axially aligned along a vertical axis which is parallel to the tie rods.

Summarizing descriptions of thermoforming and ejection are under suitable subtitles below.

Description of Index and Carrier Assembly FIGS. 3–10

As best seen in FIGS. 3–10 the index and carrier assembly has a pair of spaced apart carrier plates 18, 19 supported in cantilever fashion from the drive shaft 16. These plates support and operate the die sets 20, one set being described in the next section. Actually, a matched pair of carrier plates 18, 19 and four die sets 20 are at each workstation so the illustrated embodiment has three sets of carrier plates and twelve sets of dies as well as four sets of anvils 8, 28 and four sets of thermoforming molds.

When the carrier plate unit is assembled, the upper and lower carrier plates 18, 19 are held in position by a carrier support means, having a pair of flanged support pins 32. The upper and lower ends of each support pin are slidably received and supported respectively in a bracket assembly, viz., linear bearings 33, 34 in the L-shaped bracket 35 and hexagonal lower hub 36. The flange 37 of each support pin is bolted to the mounting lip 38 of the lower carrier plate from which the upper carrier plate is supported. The mounting lip is that part which extends from beneath the upper plate. Thus the carrier plates 18, 19, float, that is move parallel to the axis of the shaft 16 — here move up and down vertically responsive to machine operations e.g. they move up at the forging station and then they drop back down after a forging stroke.

The construction illustrated includes the machine frame at the bottom of which is the indexing rotary drive 17 (FIG. 6) from which rises the vertical drive shaft 16. The drive shaft is also supported in intermediate and upper bearings 41, 42 (FIG. 8) which are both preferably frictionless radial bearings. The portions of the drive shaft between the intermediate bearing 41 and indexing drive is preferably enclosed within a housing 43 or dam at the uppermost end of which is mounted the intermediate bearing 41.

The upper bearing 42 is supported from the frame by a removable depending structure having a horizontal cover plate 45 to which is welded a cruciform structure 46 that tapers downwardly to the bearing 42. Those skilled in the art will recognize this sort of structure as a strengthened cantilever beam having a cross-section that increases with the moment of the forces exerted on it. The coverplate 45 is of course fixedly secured by a plurality of bolts 47 to the frame crown 10. This arrangement facilitates removal of the upper bearing for servicing of the shaft and in connection with the changing of die sizes.

Secured to the shaft 16 between the upper and intermediate bearings is a triangular hub 50 having the hexagonal lower flange 36. The hub 50 is fixedly secured to shaft 16 and has three vertical support and locating faces 52, 54, 55 — one for each workstation 2, 4, 5 respectively — and therefore has a substantially (equilateral) triangular cross-section when viewed from above as in FIG. 7. The flange 36 has a horizontal upper outer surface for supporting and locating the carrier plate — die assembly 18–20. Each L-shaped support bracket 35 is secured by a plurality of bolts 57 on each (for locating precision) of the vertical locating surfaces 52, 54, 55 of the hub.

The bracket assembly and pins comprise the carrier support means and allow carrier and die set motion parallel to axis 58 of shaft 16.

Before concluding this section we discuss the aligning 160 and carrier plate spacing 162 means of FIGS. 10 and 9. The aligning means 160 comprises at several locations (two per pair of plates shown) a bushing 164 secured to the upper carrier plate 18 and having a central hole 165 therein. The lower carrier plate 19 has an aligning pin 166 secured thereto so as to engage bushings 164 in the upper plate. Thus, the two plates are kept in precision alignment. Furthermore, each upper plate bushing hole engages another pin 168 (FIGS. 25, 26) during the ejection operation in such a manner as to maintain its alignment when the plates are widely separated and to permit it to be returned aligned to the lower plate. Actually, pin 168 is a vertical guide rod for the ejector station pickup crosshead 182.

The carrier plates are spaced apart by the spring and sleeve assembly 162 of FIG. 9. The spring 170 per se is mounted in an inverted closed end flanged sleeve 171 which is slidably mounted in a retaining bushing 172 which latter is held by bolts 174 to the lower carrier plate. The retaining bushing is shaped like a piece of tubing with a flange about its middle. The lower face of the retaining bushing engages the flange 175 on the spring retainer thereby to act as a stop. This construction permits preloading the spacer spring. The upper carrier plate has recesses 176 to receive sleeve 171 and rests on top of a plurality of these spring means. As is evident from a review of FIGS. 5, 9, 22–24, the upper carrier plate 18 can be lifted up from engagement with these spring type separators and is so lifted and separated at the ejection station 5. Each upper plate 18 has three lifter blocks 180 thereon that engage mating pickup lugs 181 on the pickup crosshead 182.

The carrier plates 18,19 bar means 24 for unlocking the die set 20, specifically one die handle 485 fixed to each locking ring, a follower unlocking rod 486 supported to longitudinally reciprocate by brackets 487, 488 from lower plate 19, a plurality of stops 489 (one for each die set 20) secured on the rod 486 to engage each handle, and four springs 190 at each die or other resilient biasing means to urge each locking ring toward the locked position. A cam 191 is located on the frame rear column 14 at the ejection station 5 to operate follower 486 so that all locking rings move to the unlocked position of FIG. 16. A cam roller 192 is rotatably supported because of urging by springs 190 from links 193, 194 (pivotally connected to the rod 186, each other, and plate 19 respectively) to engage cam 191. Indexing movement of a pair of plates 18, 19 to ejection station 5 (e.g. FIG. 7) past cam 191 unlocks the die set 20 by rotation of locking ring responsive to reciprocation of rod 486 and thus prepares for the ejection function described elsewhere referring to FIG. 5.

Forging Die Set 20 and Anvils FIGS. 3, 7–18A, 18B, 27, 28

Only one die set 20 will be described herein, that being representative of the construction used in all. Ordinarily, all of the forging dies in an assembled operating machine would be intended for making substantially the same, indeed indentical if that is possible, products. Functionally, the dies operate as described in the above-referenced U.S. patents, viz: The purpose of the instant die set, is to lockingly engage or hold the preform B lip throughout transport and thermoforming until ejection of the product from the machine while cooperating with forging and forming tooling (which it mates with in precision manner).

Die set 20 (FIGS. 11, 18B) has three major components — lower lip ring 60, upper lip ring 61, and locking ring 62, and at the forging station set 20 mates with fixed anvil 28 (also called upper anvil), and moving anvil or hammer 8. Upper and lower rings 61, 60 are the workpiece lip shaping means per se but the hammer and anvil also cooperate to provide the requisite shape of the resulting die cavity for preform B.

The three ring members 60, 61, 62 are arranged to lock together by rotating the locking ring 62 to engage number of bayonet type lugs on the upper ring (FIGS. 15–17). This locking function takes place in response to moving a pair of carrier plates 18, 19 vertically sufficiently to trip the latch means of FIGS. 31–33 at the forging workstation 2 near the end of the forging stroke. The rings remain in this locked condition until they have passed through the thermoforming operation and are moving into the ejection station where they are unlocked. Of the three ring components, only the locking ring 62 rotates to achieve this function, but the carrier plates 18, 19 and associated members on the machine 1 coordinate motion of the upper and lower lip rings 61, 60 toward each other and away from each other at the appropriate time.

The upper lip ring 61 (FIG. 12) is fixedly secured to the upper carriage plate by a plurality of bolts 63 that extend through holes 64 in a circumferential flange 65. Ring 61 is ring-shaped and has a lower working surface 66 (FIG. 28) for cooperating with the lower lip ring 60 to form a lip likewise numbered 66 (B, C FIG. 1) on the preform. The lip 66 can be of any particular shape as shown in the referenced patents but does have to be an enlarged or thickened peripheral area and of course both the upper and lower rings are contoured to provide same as shown in detail in FIGS. 11, 18B, 27, 28. The upper working surface 67 of the upper lip ring cooperates with the anvil 28, providing a recessed shoulder that acts as a stop against the anvil and a tapered inner ring 69 that diverges toward the anvil.

The upper lip ring also has a plurality of peripheral bayonet lugs 70 as its outermost extremities. These lugs 70 are located to cooperate with matching lugs 71 on the locking ring to interfere with rotation per FIG. 16 thus to prevent the rings locking up and conversely to engage the same locking ring lugs responsive to carrier ring closure during forging to achieve locking (FIG. 17). The lugs 70, 71 have cam surfaces 72, 73 respectively that wedgingly engage each other.

The locking ring 62 is located in a circular recess 75 in the lower carrier plate 19. It is essentially a circular annulus and is the only one of the three rings that rotates. The locking ring has a substantially continuous lower inner flange 76 which extends radially inwardly of the die assembly for underlapping locating flanges 77 on the outer dimension of the lower lip ring. Innermost shoulder 78 of flange 76 locates on the outer surface 79 of the lower ring. The bayonets 70, 71 extend inwardly from web 80 and are spaced apart or interrupted and provide sufficient cutaway space therebetween so the other rings can be assembled thereto, e.g. the arcuate distance between lugs 71 allows dropping flanges 77 therebetween during assembly. The upper surface of the locking ring web is castellated by having cutaway portions 81 adjacent each lug.

The lower lip ring 60 is secured fixedly to the lower carrier plate by a plurality of bolts 84 extending through bolt holes 85 in a circumferential web 86. Assembly notches 88 are in the flange periphery to permit slipping same over locking ring lugs 71 during assembly.

The upper surface 90 of the lower lip ring 60 is contoured to cooperate with the upper lip ring thereby to achieve a lip extending around the preform B. The shape of this lip therefore determines the shape of the cooperating die surface. The hammer 8 is engaged by the tapered inner surface 92 of the lower lip ring. A locating shoulder or stop 93 is provided on the lower face of this lip ring, i.e. that one facing the hammer.

The hammer 8, an assembly of four individual moving anvils or hammers on a crosshead, is driven between top and bottom dead centers of its position by a crank 29, 30. Crosshead 15 (FIG. 3) is slidably engaged on the tie rods 9 which serve as vertical guides (e.g. FIGS. 1, 2). A crosshead 15 is used so that all of the hammers 8 move simultaneously through their particular cycle of operations. Crosshead 15 is preferably a welded steel box with top, side, bottom walls 15A, 15B, 15C, 15D with two wrist pin extensions 15E for supporting each wrist pin 94 preferably in a bushing 95.

Each individual hammer 8 has a striking member (head) 96 shaped like a slightly flanged cylinder with the striking surface 97 (face) facing upwardly toward the lip rings and of course located in register therewith. The rim 98 of the working surface is tapered for engaging the lower ring (FIG. 28). The lower end 99 of the head is wrapped with electrical heaters 100 and fitted into a recess 102 in its mounting pedestal 103. The recess is lined with insulation 104. The walls of each hammer recess are formed by a sleeve 105 and the bottom of the recess is formed by a pedestal. The sleeve and hammer profile is stepped and has vertical clearance at 106 and has a face 107 to engage the stop surfaces 93 on the lower ring. In each instance a plurality of bolts 110, 111, 112 secures the sleeve to the pedestal, the pedestal to a hammer base 113, and the hammer base to the crosshead 15. A long center bolt 114 extends up through this assembly and threadedly engages the underside of the head 96 to pull the same down tight against the pedestal and the mounting sleeve within which bolt 114 is located. Preferably, thermal insulation 104 is located under the head of the bolt as well as along the bolt sleeve. The insulation of the last two places is preferably fiber glass reinforced epoxy composition whereas the insulation about the anvil recess is preferably a ceramic paper, several thicknesses of which are applied to give the requisite axial and diametral thicknesses.

Finally, a thermocouple 115 is provided in a well 116 formed in the hammer and extending up toward the active face 97 of each hammer. As is well-known in the thermocouple art, the thermocouple is wired into a control circuit to regulate the flow of electrical energy to the heater 100. The sleeve is stepped at 117 for lower ring shoulder 93 engagement.

The upper anvil 28 is constructed in an analagous fashion, having a flanged cylindrical anvil 120 wrapped with electric heater wire 121 bedded in insulation 124 with recess 122 formed by the assembly of a sleeve 125 and pedestal 127 and being held in position by a center mounting bolt 134 having insulation 124 under its head and along its axis. A thermocouple 135 wired as already indicated is provided in a thermocouple well 136 within the anvil. The anvil-sleeve profile is stepped at 137 for upper ring engagement.

Of interest on each upper fixed anvil 28 is a fluid pressure relief system 140 (FIG. 18B) provided as a shock absorber and failsafe measure against too long a stroke by the hammer, too thick or large a workpiece, etc. This relief system comprises a cylinder block 141 having a fluid (preferably a compressable fluid, e.g. air) cylinder 142 formed therein. Preferably a single block 141 contains all of the cylinders 142 therein, one for each forge e.g. four cylinders as illustrated in FIG. 1. Slidably fitted within the air cylinder is a piston member 143 having a seal ring 144 engaging the cylinder wall. This piston member has an integral connecting rod 146 depending therefrom through the bottom end of the cylinder block and past bearings 148 to a location where the anvil assembly 28 just described is bolted thereto.

The cylinder 142 in turn has a passageway 150 extending through the upper wall and connected by conduit 151 to a conventional high pressure relief means 152 preferably comprising a standard bursting disc assembly (set e.g. for 4125 psi) and to a pressure regulator 153 (set for operating pressure e.g. 3100 psi) through an accumulator 154 (FIG. 1). Conduit 156 delivers compressed air.

The accumulator-conduit-cylinder chamber system 140-141-154 preferably is filled with air at the predetermined operating pressure (e.g. 3100 psi) to preload the entire system. It acts like a spring and during normal operation permits a short upward motion of anvil 118 hence of piston 146 and a return motion. In case of an overstroke by the hammer, the piston 146 is moved up against the pressure, compressing the air therein and in the accumulator past the operating pressure which causes relief valve 153 to open, and if the malfunction is severe enough, to cause the high pressure release 152 to open. Other details of the upper or fixed anvil include its securement by a plurality of bolts 158 to the machine crown 10.

Operation of the Forging Station (FIGS. 1, 3, 7-18B)

The carrier plates 18, 19 and their associated dies 20 are indexed into position at the forging station 2 so that they are in register with respective hammers and anvils as seen in FIGS. 18A-18B. The blank A is then placed on each one of the hammer faces 97.

The crank shaft 29 in the drive system is rotated and the crosshead 15 bearing all the hammers 8 is driven straight up until the workpieces are smashed between the hammers 8 and anvils 28. During this vertical upper motion (FIGS. 18B, 27), die pilot surface 159 begins to engage, hence align rings 60, 61, the hammer engages the mating parts of the lower ring (107 engages 93), and the lower carrier plate is moved upward and pushes the ring 60, 19 against the anvil (68 engages 137 because the carrier pins 32 slide linearly in bearing 33, 34) until the blank A engages the anvil face 128. When the two lip rings 60, 61 are forced by the same hammer motion into their fully engaged position (FIG. 28) and the blank A flows out to fill the die cavity and to make the preform B. While the lip rings are thus being engaged, the carrier spacer springs 170 of FIG. 9 become compressed. A slight vertical upward movement of plates 18, 19 due to anvil action starts the locking operation which then is achieved by rotation of locking ring 62 under the bias of springs 190 until fully locked (FIG. 17). The unit 20 remains locked until an appropriate time in the ejection cycle.

Summary of Thermoforming Station (FIGS. 1, 4, 6, 7)

The preform B while still locked in the rings 60, 61 and 62 is quickly moved from forging station 2 to thermoforming station 4 by indexingly rotating shaft 16 thereby turning each set of carrier plates 120° to the next work station. The drive system is illustrated in FIG. 6 and described elsewhere herein. For present purposes the indexing motion of the shaft 16 is achieved by the indexing gear box 17. Referring to FIGS. 4 and 6 especially, the thermoforming operation is now ready to go forward at the same time that the other two work stations are forging and ejecting, respectively. This is all done in timed relationship by reason of the drive drain of FIG. 6.

The carrier plates with preform B locked therein are brought into exact register with the thermoforming upper and lower members 211, 212 which are respectively mounted on upper and lower forming crossheads 213, 214. At this station the crossheads 213, 214 are moved vertically to align their respective tooling members with matching parts on the die set 20 and then to execute a thermoforming cycle to form tub C. The crossheads are moved vertically by a double crank mechanism, i.e. a crankshaft (upper 215, lower 216) and connecting rod (upper, lower 217, 218) drives each crosshead in typical slider crank mechanism manner.

Thermoforming tooling may be as described in the above U.S. patents, and in all events matches or mates with the upper and lower lip rings as at the shoulders 67 and 93 and the tapered surfaces 69, 92 converging therefrom to the preform. Higher production rates are preferably achieved using plug assisted thermoforming with artificial cavity cooling as is well-known in the art. As illustrated, plug 211 assists in pushing the preform into the cavity of mold 212. Also, if desired, plug 211 can be heated by a thermocouple in the same manner that the hammer and anvil 8, 28 are heated. The state of the thermoforming art is such that details of the thermoforming cycle are omitted and the reader is referred to said patents.

Upper and lower crossheads 213, 214 are guided in vertical lines by vertical guide bars 221, 222 attached rigidly to each crosshead and fitted into a mating vertical guide 223, 224, respectively, which are in turn welded or otherwise rigidly secured to the crown 10 and base 11, respectively. Only one guide is shown schematically for each crosshead in FIG. 4, but it is preferred to use a guide mounted at each end as illustrated for the lower crosshead 214 in FIG. 1 and upper in FIG. 26.

Each crosshead 213, 214 is driven in an indexing fashion with a dwell period to hold the mold parts 211, 212 closed during thermoforming by means of an indexing drive as further described in connection with the drive train of FIG. 6.

Summary of Ejection Work Station (FIGS. 2, 5, 7 and 19–24, 26)

After preform B has been thermoformed into an article such as the shallow tub C, the indexing drive 17 rotates the shaft 16 another 120° to move the carrier plates containing tub C to ejection station 5. While the plates 18 and 19 are being brought into position at ejection station 5, the unlocking cam 191 (FIG. 7) and follower rod 186 (FIG. 7) cooperate to unlock the four die sets 20 that are being thus positioned, at which time the components will appear in plan view as illustrated at station 5 in FIG. 7. The reader will appreciate that unlocking means 24 has been operated to unlock all of the die sets 20 (that are at station 5 — those at the other stations remain locked) so that the system is now prepared for ejection.

The ejection system comprises (FIG. 5) an unclamping means (180–182) for vertically separating the carrier plates, 18, 19; removing means 185 for vertically removing away tub C from whichever die ring it has stuck to (normally upper ring); and stripper means 187 for horizontally moving the tub C out from between the separated plates and to release the tub, all operating in timed relationship responsive to the cams 188–190 on the continuously turning camshaft 269.

Thus, the ejection system has three crossheads driven in timed relation to remove the tub C. Two crossheads 182,185 are vertical and operate in sequence — the first 182 to vertically separate the carrier plates by engaging lugs 180, 181; the second 185 to remove the tub from one of the lip rings using vacuum cups 195, and third 187 to horizontally move tub C out of the machine.

Thus, ejecting the product — here tub C — the locking ring 62 having been cammed to the unlocked position — involves separating the carrier assembly 18,19,20 to release the lip 66 from clamping. The lip shape causes the tub to stick in the upper ring 61. Separation is achieved with crosshead 182 pulling plate 18 vertically up until both plates 18, 19 are spaced far enough apart to permit horizontal removal of tub C. At this point the tub C is removed from upper ring 61 using the suction cup 195 engagement followed quickly by horizontal removal of the tub from between the spaced plates 18,19 using stripper plate 196.

Referring to FIG. 5, the means for separating carrier plates 18, 19 includes a vertically moving pickup cross head 182 that is arranged to slide vertically on guide rods 168 in a timed cycle determined by the shape of the face cam 188. A follower/connecting rod 197 transmits appropriate motion from the face cam to the crosshead 182.

As noted above in the description of the carrier, there are lifting lugs and blocks 180, 181 on the crosshead 182 and upper carrier plate 18. These blocks interlock at the time of indexing the carrier plates into the ejection position of FIGS. 5, 7. The face cam 188 almost immediately separates the two carrier plates by lifting the crosshead vertically. While this is going on, removing crosshead 185 (FIGS. 2, 19, 20, 25) drives the vacuum cup(s) 195 vertically with a velocity great enough to catch up with the motion of tub C, attach vacuum cup(s) 195 by suction to the bottom of tub C, and then stop rising vertically while the plate 18 continues on upward. In other words, the vertical stroke of carrier plate 18 (crosshead 182) is greater than the vertical motion permitted by the suction cup. Immediately upon the cup 195 being suctioned it is stripped from the upper die ring 61 of the upper carrier plate by the continued rise of the crosshead-carrier plate 182,18 and assumes the position illustrated in solid lines in FIG. 5.

At this point in time, a horizontal stripper cross head 187 moves in with the stripper plate 196 which attaches itself to tub C; immediately after such attachment the suction cup 195 disengages (vacuum is shut off), and is returned to its lower or inactive position (e.g. FIGS. 19,20). Upon the suction cup 195 disengaging tub C the stripper plate 196 moves horizontally to the right as seen in FIG. 5 thereby to horizontally remove tub C from between the two carrier plates. Upon reaching the extreme right end part of the stroke (see right of FIG. 5) the tub strikes knockout bar 199, is knocked out of the stripper plate, and falls away.

Summary of Drive Train FIGS. 3–6

In brief, the drive train operating this invention uses a rotating source such as a variable speed DC electric motor 230 to drive the other components at the respective work stations. Intermediate drive train components such as gears, pulleys, sprockets with suitable ratios; indexing drives; and cams are provided to achieve the requisite operating speed, dwell periods, and other timing intervals. By using a single constantly rotating source that is mechanically tied through the drive train, positive control over the timing of all events is achieved, something which is most important because of the close mechanical fits of the various parts as well as the close timing of the operating cycle to maximize production. Although keys and splines may be used to nonrotatably secure gears etc. to shafts we prefer to use shaft locking assemblies such as the commercially available products of Ringfeder Corp., 4040 Tillman St. Westwood N.J., 07675.

Gear shaft 231 is driven by a belt and pulley arrangement 232-3-4 from the motor 230 and in turn rotates main drive gear 236 and the jackshaft 237. At one end of the jackshaft may preferably be located a brake 239 to assist in stopping the system while at the other end of the shaft is sprocket 240 for providing power to the thermoforming station.

A pinion 242 fixed to the jackshaft drives a forging gear 243 that is on the end of the forging crankshaft 29 which is supported in main bearings from the base 11. The crankshaft 29 is part of a conventional slider crank arrangement to vertically reciprocate crosshead 15 and the various hammers thereon and if desired to provide a suitable drive 245 to the blank feeding means 7.

The jackshaft 237 also drives a double angle drive 247 through a conventional sprocket and chain arrangement 240, 248, 249 to the input of such drive. An additional chain and sprocket arrangement 250-1-2 driven by the aforesaid angle drive input shaft feeds power into the indexing angle drive 17 which in turn drives the vertical carrier shaft 16 the function of which has been explained elsewhere in connection with indexing the carrier plates 18,19.

It should be understood that the term — indexing drive — refers to any one of a number of conventional means that receive constant rotary power at the input and convert it to rotary indexing or periodic motion at the output. In the present situation the indexing drives are also angle drives.

The double angle drive 247 has two vertical output shafts both of which rotate constantly. The upper vertical shaft 254 provides power to an angle gear drive 270 which turns the cam shaft 269 (FIG. 25) for operating the ejector means at work station 5. The downward shaft 255 (out of the bottom of the unit) feeds into an indexing angle drive 257 the output shaft of which has a pair of sprockets 258, 259 feeding the upper and lower thermoforming crankshafts 215, 216 respectively through sprocket and chain arrangements 259-261-263 and 258-260-262. The upper crankshaft 215 as shown in FIG. 1 and elsewhere receives its power from a chain 261 supported on a plurality of idler gears 265 which are in turn revolvably mounted on a column 266 that is part of the machine frame. The indexing drive 257 here provides the requisite dwell period to hold the thermoforming molds 211, 212 shut during the process of forming the preform B into the tub C and moves the two crankshafts in unison to do so.

Thus, the drive train receives constant rotary power from the electric motor 230 and rotates the crankshaft 29 of the forging station at a substantially constant rotary speed. Part of the drive train at the same time is operated through indexing or dwell system drives 17, 257. An indexing drive 17 is provided to the carrier shaft 16 so that it, in timed relation with the other cycle events, periodically indexes the carrier plates 18, 19 in progression from one workstation to another. Part of the drive train operating through forming indexing drive 257 operates the thermoforming crankshafts. And last, but not least, still another division of the drive train rotates vertical shaft 254 to ultimately drive the cam shaft 269 to obtain the ejection station 5 sequence of events. It is interesting to note that the cam shaft 269 mounted on the crown 10 always rotates at a substantially constant speed and obtains the requisite dwell interval and other timed events by reason of its cam shapes. The entire system as mentioned at the beginning of this section provides positive mechanical control over the drive and therefore over the sequence of events desired to be obtained.

Detailed Description of Ejection Work Station (FIGS. 2, 6, 5 and 19-30)

A previous section summarized the manner that ejection work station 5 operates with particular reference to FIGS. 2 and 5. The present section goes into the detail with respect to the different mechanisms for separating carrier plates, holding the tub temporarily (vacuum cup) between the separated plates, and horizontally withdrawing the tub from between the plates and then disposing of it. The timing for these events is taken care of by a vertical drive 254 shaft feeding into an angle drive box 270 mounted on crown 10 which in turn revolves the cam shaft 269 on which are mounted the face cams 188, 189, 190 that operate in timed relationship the vertical cross head assembly 182, horizontal crosshead assembly 187, and vacuum cup crosshead assembly 185.

A major part of the vertical assembly 182 (FIGS. 21, 23) (unclamping means) is a one piece casting (crosshead) also numbered 182 to which are fitted on its bottom three lifting blocks 181 that engage the lugs 180 on carrier plate 18 and on each side has vertically aligned linear bearings 280 — preferably frictionless e.g. ball — for engaging the vertical guide rods 168 mounted at each side of the cross head 182 and supported rigidly cantilever style from the crown 10. Crosshead 182 has a peculiar shape — in horizontal cross-section resembling a shallow U or shallow trough (FIG. 21) and has vertical and horizontal ribs 183 for strength.

The unclamping means 182 is driven vertically in response to the shape of the face cam 188. The follower system (FIG. 23) for achieving this involves a pivoted follower arm 283 having a roller 284 that engages the face cam, pivotally mounted from crown 10 at one end 285 and at the other a revolvable connection 287 to a substantially vertical connecting rod 197 which has a revolvable or pin connection 289 at its lower end to the casting 182.

The vacuum cup assembly or tub removing means 185 comprises (FIGS. 2, 19, 20, 25) a plurality of soft rubber vacuum cups 195 supported from a light frame or bracket 293 shaped like a shallow channel stood on one of its edges so that it resembles a C (FIG. 20). Each vacuum cup is a typical soft rubber or similar material cup suitable for applying vacuum pressure to the bottom surface of the product, namely the tub C. This soft rubber cup is supported on a hollow tube 294 which is slidably mounted in holes in bracket 293 to move vertically. A spring 295 in each instance biases the vacuum cup 195 and its attached tube to a desired vertical position, is compressed by stop nuts 296 at the tube top, and is limited in its stroke by nut 297 or similar stop means. The bottom of each tube has a suitable pneumatic fitting (elbow) 299 to which is connected flexible vacuum and compressed air hose 300 so that vacuum may be used to attract the tub C and compressed air when desired be used to blow it off. As illustrated in FIGS. 19 and 20, the various vacuum hoses are connected into a manifold 301 (FIGS. 19, 20 — omitted for clarity from FIG. 25) for convenience in bringing vacuum and/or compressed air to this part of the system.

The bracket 293 is mounted on a ribbed one piece cast frame 302 (the reference 302 is used in several places to emphasize the irregular shape of the casting) which is intended to be moved vertically on guides 303 on linear bearings 304 so that all four vacuum cups move in unison through their cycle. This motion is caused by the face cam 190 on shaft 269 operating a vertical drive rod 305 which through scotch yoke 306 arcuately moves vacuum lever 307 to move the cup crosshead 185 vertically on the guide rods which are supported in a frame from base 11. Vertical height adjustments for the vacuum cups are provided for by vertical slots 315 in the frame 302 to which the vacuum cup frame is connected by nuts and bolts 313.

The guide rods 303 are secured by a vacuum support assembly 308 that is preferably a one piece weldment with a main member 309 shaped in side view FIG. 20 like a G, side plates 310 for rigidity, and a plurality of brackets 311,312 for supporting the rods 303 and bearing 314 for lever 307, respectively. Assembly 308 is fixed as by bolts to base 11. Vacuum and air manifold 301 also is supported from 308. The arms 307A and 307B of lever 307 preferably are offset at bearing 314 (FIGS. 19, 20).

The horizontal crosshead assembly or withdrawing means 187 carries the stripper plate 196 at the ejection station (FIGS. 2, 21, 22 or 23). In plan view stripper 196 is a flat plate having a scalloped edge with one scallop 316 for article (tub C) to be removed (see FIG. 21). Assuming a circular tub, preferably each scallop is slightly more than 180° so that it makes a sort of snap engagement with the tub C, availing itself of the resiliency of the tub.

The flat stripper plate 196 is bolted between a pair of drive link bearing assemblies 318, one at each end. The bearing assemblies 318 carry linear ball bearings that engage the horizontal guide rods 319 which are in turn supported from the crown 10 by a frame comprising trapezoidal side plates 320 and crossbar 321. Ribs 322 may be on the sideplates for rigidity. Sideplates 320 are secured to the underside of crown 10 (FIG. 22). The horizontal motion is achieved by pushing and pulling the stripper plate assembly 195 back and forth along the guide rods by a pair of drag links 325 each of which is (FIGS. 22, 24) pivotally connected between the bearing blocks 318 and a bell crank 326 connected between such drag link at its lower arm 327 end and a face cam and follower system at its upper end 328 (FIG. 24) and being supported at pivot 330 from the crown 10 where the two bell lever arms intersect. The cam and follower system driving this bell crank include face cam 189 having an appropriately shaped groove, a cam roller 332 engaging the groove, and a connecting rod 333 pivotally connected at one end to a follower arm 334 and at the other end to the bell crank.

Two non-moving members complete the withdrawing means and contribute to successful tub removal: knockout bar 199 (FIG. 5, 21, 22) and antiflip plate 335 both of which are bolted to the frame 320, 321. The knockout bar 199 pushes tub C out of scallop 316 responsive to retraction of stripper plate 196 as best seen in FIGS. 5 (right hand tub in ghost lines) 21, 22. The antiflip plate 335 prevents the tub from somersaulting upwardly in random fashion. These parts are positioned to remove the tub after withdrawal from between the carrier plates and before the stripper plate is fully retracted.

Construction of the one piece lifter blocks 180 (also referenced as 180A-180B-180C in FIG. 7) and one piece mating pickup lugs 181 is shown in FIGS. 29, 30 respectively. Blocks 180 have a base 340 with tapped holes into which extend mounting bolts from the carrier plate to secure the block to upper carrier 18. A web 342 rises up from one side of the base at its center and a lifter jaw 344 extends from the web over the base. A bevel 345 is on each end of the jaw to facilitate engagement with the lug and the base can have a bevel 346 near each end. The flat surface 347 between levels engages a mating flat surface 348 on the lug.

Each lug 181 has a body 350 through which extends a counterbored bolt hole. The body 350 has parallel sides 351, preferably a rectangular cross-section, to engage the side walls of mounting slots 352 in the underside of crosshead 182 and be properly aligned. A cantilevered pickup jaw 354 extends from the body 350 and has on its upper face the mating flat surface 348.

The blocks and lugs are positioned to allow all three sets of them to be engaged when the carrier plates 18, 19 have been indexed to the ejection station 5 (bottom group FIG. 7) and yet to avoid mechanical interference during and after indexing. To these ends the blocks 180A, 180C (FIG. 7 only) are positioned on plate 18 with their webs 342 toward the shaft 16 while 180B (on the trailing edge rotationally speaking) is located with its web away from the shaft. Also block 180B is located on a smaller radius than is 180C from the axis of shaft 16 so that there is no interference, especially so that 180C can rotate past the lug 181 that engages 180B without any interference. Indeed, facing blocks 180B and 180C oppositely contributes to the desired clearances because the lugs are positioned accordingly.

The drive system for the removing means or vacuum cup crosshead 185 is depicted in FIGS. 2, 25, 26 as including the drive rod 305, the motion of which is given by face cam 190. The drive rod 305 is rotatably connected, as by a clevis type pin joint 358 to follower arm 359 which latter is pivotally supported by a pin joint 360 from bracket 362 that is secured to crown 10. The follower arm 359 has a cam roller 361 mounted on it and rolling in the cam groove 190.

A number of pillow blocks 364 are employed to support the cam shaft 269 and crank shaft 215.

It is important to maintain the vertical alignment of the die sets 20 when they are separated by the unclamping means. The alignment must be kept as close as possible to that required by the aligning means 160 (FIG. 10) so that the carrier plates are correctly reassembled at the end of the ejection cycle and to avoid damaging the die set 20. To this end the vertical guides 168 have their lowermost end spaced vertically from carrier plate 18 such that said end of guide 168 enters the pilot hole 165 in bushing 164 before the plate 18 has been pulled clear of pin 166.

The vertical cross head, horizontal cross head, and vacuum cups are all caused to move in timed relationship to separate the plates (FIG. 23 ghost 18), strip away the tub from the carrier (upper ghost C, FIG. 23), horizontally withdraw the cup C from between the carrier plates 18, 19, dispose of the tube C (FIG. 21) knock out or otherwise and then return everthing to its initial position except for the tub so that the carrier plates and their rings will be ready to proceed to the next event which is the forging station. As already explained the route to the forging station involves moving the die set rings to the FIG. 16 position under the bias of the springs 190 when follower rod 24 disengages cam 191 during indexing from ejection to forging workstations.

Preferred Embodiment Featuring A Lip Ring Locking Delay and Trip Means (FIGS. 31, 32, 33)

The purpose of the FIGS. 31, 32, 33 apparatus is to delay locking the lip rings by rotation of the locking ring until the lip rings are fully driven together to the FIG. 28 position.

The right hand support bracket 488 (FIG. 7) preferably is also part of a mechanical die locking delay subassembly 380 illustrated in detail in FIGS. 31, 32, 33 wherein it acts as the fixed and upper support for helical spring 382 mounted in compression against one end of lever 383 (or a similar resilient biasing means) to urge the lever to rotate clockwise about pivot 384 as viewed in FIG. 31. A blind hole in the lever affords a spring seat. Pivot 384 is preferably a horizontal socket (allen) head shoulder screw or bolt secured in a tapped hole 385 in lower carrier 19. Washer 386 on the screw shank spaces the lever from the edge of carrier plate 19.

Lever 383 is L-shaped viewed in plan to provide an offset end platform 387 to which is bolted a vertical threaded shank of cam follower 388. The threaded shank allows vertical adjustment of follower 388 so it can engage cam 389 that depends from the air cushion block 141 (FIG. 18B) when the hammer has driven the lip dies fully home to the FIG. 28 relation at which time the lever is tripped and permits rod 186 hence the locking rings 62 to move to the fully locked position of FIG. 28. Cam 389 is conveniently a depending bar threaded at its shank for bolting to bracket 390 by a pair of nuts 391. The release or trip action occurs when the carrier plates 18, 19 are moved vertically up (FIG. 18B) when the impact of hammer 8 drives the lip rings to final FIG. 28 engagement and compressing the air cushion in cylinder 141, 142: the lever at the terminal part of the stroke rotates counterclockwise (FIG. 31) when follower 388 hits stationary cam 389.

The rod 486 is prevented by lever 383 from moving axially, hence the locking rings 62 are prevented from locking during most of the stroke of the forging hammer. This is achieved by a locking sleeve 392 secured by set screws to the rod 486. The sleeve 392 is preferably square in cross-section (FIG. 32) one end 395 of which "hangs up" or engages a correspondingly shaped lip 396 on the non-offset part of the lever end.

What is claimed is:

1. A machine for transporting a workpiece to a series of workstations arranged in a generally circular path comprising
    a machine frame;
    a shaft revolvably supported in said frame and having an axis about which it revolves;
    a carrier assembly for engagement of at least one workpiece having first and second carrier plates, a die set, and a locking means connected to the die set for locking and unlocking said die set when said shaft is revolved;
    said die set further including first and second lip rings for gripping a workpiece respectively mounted on said first and second carrier plates and a generally circular locking ring that is revolvably supported about one of said lip rings, connected to said locking means, and arranged to engage the other said lip ring and lock the two said lip rings into engagement with each other when said locking means is operated responsive to said shaft being revolved; and
    a carrier support means mounted between and to one of said shaft and said carrier assembly for supporting the carrier plates of said carrier assembly to revolve with said shaft and for motion relative to and substantially parallel to said shaft axis.

2. A machine according to claim 1 for transporting simultaneously a plurality of workpieces wherein said carrier assembly has at least one additional such die set thus forming a plurality of said die sets each set being constructed and arranged as aforesaid, the locking rings of each of said die sets being connected to said locking means for substantially simultaneous revolving thereby to unlock and lock all of said sets substantially simultaneously.

3. A machine according to claim 1 that further includes
    an indexing drive means supported on said frame and connected to said shaft for periodically turning said shaft through a predetermined angle about said axis to a predetermined position;
    first and second workpiece shaping means mounted on said frame at one of said workstations, at least one of said shaping means being mounted to reciprocate relative to the other such shaping means;
    said carrier support means supporting said carrier assembly to move the lip rings of said die set to said predetermined position between and in register with said workpiece shaping means when said indexing means periodically turns said shaft.

4. A machine according to claim 1 wherein said locking means further comprises a cam follower means mounted on said carrier assembly, a means biasing said follower and locking ring to locked position, and a cam on said machine frame to unlock said carrier assembly members by moving said locking ring against said biasing means responsive to being moved to one of said workstations.

5. A machine according to claim 4 wherein said locking means includes means for delaying locking said lip rings at another position by rotation of said locking ring under the urging of said means biasing said locking ring.

6. A carrier apparatus for supporting and transporting by an indexing periodic movement at least one workpiece gripped by a set of dies through a horizontal circular path wherein said set is stopped in alignment at a plurality of workstations comprising the combination of:
    a machine frame;
    an indexing drive;
    a shaft revolvably supported at least partly in said frame and driven by said drive to turn about a substantially vertical axis longitudinal of said shaft;
    a carrier support means secured to said shaft;
    a die set that includes first and second respective die rings and a circular locking ring;
    locking means to operate said locking ring;
    an upper carrier plate in which said first die ring is supported;
    a lower carrier plate in which said second die ring is supported in register with said first die ring;
    said locking ring being connected to said locking means and supported from one of said die rings to rotate thereabout and to engage the other of said die rings, said locking means being at least partly supported from one of said carrier plates to cause said locking ring to rotate at predetermined times; and
    said carrier support means engaging said upper and lower carrier plates radially outwardly from said shaft axis to support said plates in a substantially horizontal position for motion parallel to said axis.

7. A carrier apparatus according to claim 1 wherein said carrier support means includes a bracket assembly secured to said shaft and having first and second radially extending members spaced axially apart along said shaft and said apparatus further comprises at least one plate mounting pin parallel to said shaft axis and reciprocably mounted in said radially extending members, at least one of said carrier plates being secured to said pin whereby said carrier plate assembly is slidably mounted to move parallel to said shaft axis.

8. A carrier apparatus according to claim 6 further comprising:
    said locking ring and first die ring each having interengagable interrupted bayonet lugs.

9. A carrier structure according to claim 6 further including lifting blocks mounted on said upper carrier plate, vertically movable lifting means supported on said machine frame for engaging said lifting blocks and lifting said upper carrier plate when said locking and other said die rings are disengaged.

10. A carrier apparatus according to claim 6, comprising
said locking means including a cam secured to said machine frame to present a cam surface extending along a part of the path of one of said carrier plates when said shaft is indexingly rotated, and a follower mounted on one of said carrier plates to engage said cam in the course of indexing rotation; and
means connected between said locking ring and said follower to rotate said locking ring to unlock said die set responsive to the follower engaging the cam.

11. Apparatus accordng to claim 9 wherein said follower includes a rod slidably mounted to reciprocate along the outer edge of said lower carrier and connected to said follower, at least one stop on said rod to engage a member supported by said carrier plate; said means to rotate includes a handle secured to said locking ring and extending out to engagement with said stop; and first biasing means to bias said carrier plates apart; and second biasing means urging said locking ring against said stop and to rotate to a position of locking.

12. Apparatus according to claim 11 wherein each of said biasing means is a resilient member.

13. Apparatus according to claim 12 wherein at least one of said resilient members is a spring.

14. Carrier apparatus according to claim 6 further comprising:
a plurality of lifter blocks extending upwardly from said upper carrier plate;
an unclamping means having a corresponding plurality of pick up lugs that supports said lugs at respective positions to engage said lifter blocks when said indexing drive positions said plates at one of said workstations, said unclamping means further including guide and drive means to lift said upper carrier plate and the lip ring thereon in a direction parallel to said shaft axis out of engagement with said lower carrier plate and the lip ring thereon and to a predetermined space apart therefrom while maintaining both plates aligned;
a removing means positioned in register with said die set for removing a workpiece from said upper carrier plate; and
a stripper means for entering said space to engage and remove said workpiece along a path substantially normal to said axis.

15. Carrier apparatus according to claim 14 wherein said guide means comprises a crosshead and a pair of spaced apart rods parallel to said shaft axis on which said crosshead is slidably mounted.

16. Carrier apparatus according to claim 6 further comprising a locking delay means to delay the operation of said locking means until a predetermined point in the cycle of events.

17. Carrier apparatus according to claim 16 wherein said delay means delays locking until the die set lip rings have been driven at least partially into engagement with themseleves and the workpiece.

* * * * *

UNITED STATES PATENT OFFICE
CERTIFICATE OF CORRECTION

PATENT NO. : 4,133,625
DATED : January 9, 1979
INVENTOR(S) : Arnold L. Kellermann and David I. McDonald It is certified that error appears in the above-identified patent and that said Letters Patent are hereby corrected as shown below:

Column 6, line 62, the word "bar" should read -- bear --;

Claim 11, line 1 (or column 19, line 14) the parent claim "9" should read -- 10 --.

Signed and Sealed this

Tenth Day of April 1979

[SEAL]

Attest:

RUTH C. MASON
Attesting Officer

DONALD W. BANNER
Commissioner of Patents and Trademarks